United States Patent
Monjas Llorente et al.

(10) Patent No.: US 10,165,463 B2
(45) Date of Patent: Dec. 25, 2018

(54) CONGESTION MITIGATION BY OFFLOADING TO NON-3GPP NETWORKS

(71) Applicant: Telefonaktiebolaget LM Ericsson (publ), Stockholm (SE)

(72) Inventors: Miguel Angel Monjas Llorente, Madrid (ES); Alejandro Bascuñana Muñoz, Torrevieja (ES); Patricia Sanchez Canton, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/513,497

(22) PCT Filed: Sep. 25, 2014

(86) PCT No.: PCT/EP2014/070566
§ 371 (c)(1),
(2) Date: Mar. 22, 2017

(87) PCT Pub. No.: WO2016/045739
PCT Pub. Date: Mar. 31, 2016

(65) Prior Publication Data
US 2017/0311198 A1  Oct. 26, 2017

(51) Int. Cl.
*H04W 28/02* (2009.01)
*H04L 12/14* (2006.01)
(Continued)

(52) U.S. Cl.
CPC ..... *H04W 28/0226* (2013.01); *H04L 12/1407* (2013.01); *H04W 28/08* (2013.01); *H04W 72/048* (2013.01); *H04W 72/0413* (2013.01)

(58) Field of Classification Search
CPC .......... H04W 28/0226; H04W 72/048
See application file for complete search history.

(56) References Cited

U.S. PATENT DOCUMENTS 8,326,289 B2 * 12/2012 Gunder ............. H04W 60/00
455/432.1
8,831,014 B2 * 9/2014 Koodli ................ H04L 12/14
370/401
(Continued)

FOREIGN PATENT DOCUMENTS

EP        2 571 311 A1     3/2013
WO    WO 2014 005654 A1   1/2014

OTHER PUBLICATIONS

3GPP TS 24.302 v12.4.0; Technical Specification; 3rd Generation Partnership Project; Technical Specification Group Core Network and Terminals; Access to the 3GPP Evolved Packet Core (EPC) via non-3GPP access networks; Stage 3 (Release 12)—Mar. 2014.
(Continued)

*Primary Examiner* — Parth Patel
(74) *Attorney, Agent, or Firm* — Baker Botts, LLP

(57) ABSTRACT

Methods and apparatus for congestion mitigation in telecommunications networks. In an exemplary apparatus, a network node (314, 500; 302, 400) in a telecommunications network is provided, the node comprising: a receiver (504; 404) configured to receive congestion data identifying a congested area (A-H) and one or more user equipments, UE, (a-j; 312) affected by the congested area; an alternative network determiner (516; 420) configured to determine one or more switchable UEs, amongst the identified UEs, that may be offloaded to an alternative access network (1-3); and a network switcher (518; 422) configured to control a transmitter (502; 402) to transmit an instruction for one or more of the switchable UEs to switch to an alternative access network.

27 Claims, 12 Drawing Sheets

(51) Int. Cl.
*H04W 28/08* (2009.01)
*H04W 72/04* (2009.01)

(56) References Cited

U.S. PATENT DOCUMENTS

| | | | | |
|---|---|---|---|---|
| 8,839,427 | B2* | 9/2014 | Morrow | H04L 63/1458 726/13 |
| 9,197,714 | B2* | 11/2015 | Stenfelt | G06Q 30/02 |
| 9,209,990 | B1* | 12/2015 | Szabo | H04L 12/4641 |
| 9,319,851 | B2* | 4/2016 | Yu | H04W 4/10 |
| 9,363,708 | B2* | 6/2016 | Anwar | H04W 28/08 |
| 9,681,349 | B1* | 6/2017 | Vivanco | H04W 36/22 |
| 9,912,449 | B2* | 3/2018 | Gupta | H04L 5/0007 |
| 9,913,169 | B2* | 3/2018 | Forssell | H04W 28/08 |
| 2006/0030339 | A1* | 2/2006 | Zhovnirovsky | H04W 4/02 455/456.6 |
| 2011/0231561 | A1* | 9/2011 | Pawson | H04W 4/02 709/228 |
| 2012/0214502 | A1* | 8/2012 | Qiang | H04W 8/12 455/453 |
| 2012/0269134 | A1* | 10/2012 | Jin | H04W 28/085 370/328 |
| 2012/0294142 | A1* | 11/2012 | Kneckt | H04W 74/002 370/229 |
| 2013/0070594 | A1* | 3/2013 | Garcia Martin | H04W 28/08 370/235 |
| 2013/0142042 | A1* | 6/2013 | Garcia Martin | H04L 12/5692 370/230 |
| 2013/0143542 | A1* | 6/2013 | Kovvali | H04W 48/18 455/418 |
| 2013/0286826 | A1* | 10/2013 | Park | H04W 28/0231 370/230 |
| 2013/0310030 | A1* | 11/2013 | Ventimiglia | H04W 48/16 455/434 |
| 2014/0029420 | A1* | 1/2014 | Jeong | H04L 12/5692 370/229 |
| 2014/0078906 | A1* | 3/2014 | Chen | H04L 69/18 370/237 |
| 2014/0092742 | A1* | 4/2014 | Chou | H04W 4/70 370/235 |
| 2014/0160940 | A1* | 6/2014 | Maehara | H04W 28/08 370/237 |
| 2014/0198637 | A1* | 7/2014 | Shan | H04W 52/243 370/229 |
| 2014/0213277 | A1* | 7/2014 | Jang | H04W 28/08 455/453 |
| 2014/0370895 | A1* | 12/2014 | Pandey | H04W 36/22 455/436 |
| 2015/0029879 | A1* | 1/2015 | Chou | H04W 4/70 370/252 |
| 2015/0139007 | A1* | 5/2015 | Liu | H04W 24/08 370/252 |
| 2015/0195760 | A1* | 7/2015 | Sanz | H04W 36/22 370/230 |
| 2015/0296440 | A1* | 10/2015 | Forssell | H04W 48/08 370/329 |
| 2016/0029247 | A1* | 1/2016 | Shan | H04W 4/70 370/235 |
| 2016/0073282 | A1* | 3/2016 | Speicher | H04W 28/0284 370/230 |
| 2016/0119844 | A1* | 4/2016 | Uchino | H04W 36/22 370/229 |
| 2016/0127967 | A1* | 5/2016 | Liu | H04W 28/08 455/438 |
| 2016/0183140 | A1* | 6/2016 | Puddle | H04W 36/14 370/331 |
| 2016/0309385 | A1* | 10/2016 | Zhang | H04W 48/14 |
| 2016/0343037 | A1* | 11/2016 | Nicholas | G06Q 30/02 |
| 2017/0006498 | A1* | 1/2017 | Matas Sanz | H04W 28/08 |
| 2018/0027469 | A1* | 1/2018 | Fukuta | H04W 36/14 |

OTHER PUBLICATIONS

3GPP TS 23.402 v12.4.0; Technical Specification; 3rd Generation Partnership Project; Technical Specification Group Services and System Aspects; Architecture enhancements for non-3GPP accesses (Release 12)—Mar. 2014.

3GPP TR 23.705 v0.10.0; Technical Report; 3rd Generation Partnership Project; Technical Specification Group Services and System Aspects; Study on system enhancements for user plane congestion management (Release 13)—Apr. 2014.

International Search Report for International application No. PCT/EP2014/070566 dated Feb. 12, 2015.

* cited by examiner

CONGESTION MITIGATION BY OFFLOADING TO NON-3GPP NETWORKS

PRIORITY

This nonprovisional application is a U.S. National Stage Filing under 35 U.S.C. § 371 of International Patent Application Serial No. PCT/EP2014/070566 filed Sep. 25, 2014, and entitled "Congestion Mitigation By Offloading To Non-3GPP Networks."

TECHNICAL FIELD

The invention relates to mitigation of congestion in network traffic by offloading to non-3GPP access networks.

BACKGROUND

Radio Access Network (RAN) user plane congestion occurs when the demand for RAN resources exceeds the available RAN capacity to deliver the user data for a period of time. RAN user plane congestion leads, for example, to packet drops or delays, and may or may not result in degraded end-user experience.

In order to cope with RAN user plane congestion, different issues must be addressed. One of them is the application of congestion mitigation measures. Such measures include traffic prioritization, traffic reduction and limitation of traffic. Congestion mitigation measures are implemented to manage user plane traffic across a range of variables including the user's subscription, the type of application, and the type of content.

The Third Generation Partnership Project (3GPP) has discussed several options to cope with user plane congestion (UPCON) and has agreed on the architecture shown in FIG. 1.

A new logical function entity, a RAN Congestion Awareness Function (RCAF) 100, is included in the architecture to report RAN User Plane Congestion Information (RUCI) to a PCRF 102 for the purpose of congestion mitigation. The RCAF 100 is in electrical communication with the Policy Control and Charging Rules Function (PCRF) 102 via an Np reference point. The RACF is also in electrical communication with a RAN Operations, Administration and Maintenance (RAN OAM) module 104 and with a Mobility Management Entity (MME) or Serving General Packet Radio Service Support Node (SGSN) (for the remainder of this specification the MME is referenced as 106a and the SGSN is referenced as 106b) via a Nq or Nq' reference point.

It is noted that the term "electrical communication" encompasses both wired and wireless electrical communication. Therefore, electrical communication may be, for example, a network communication over a wired connection or a network communication of over a radio frequency connection.

The RCAF 100:
Collects raw user plane congestion information from the RAN OAM 104. The RAN OAM 104 corresponds to Operations Support System (OSS) level features of a RAN operator;
Determines a list of user equipments (UEs) impacted by user plane congestion;
Integrates an RAN congestion status with an integration time fitting with Core Network (CN) mitigation tools (e.g., to provide the PCRF 102 with only information on sustained congestion);
Provides "spatial" integration of RUCI, if the RUCI associated with a cell should depend on a congestion status in neighbouring cells (e.g., in case intra-eNB mobility reporting is not activated).

The PCRF 102 may then provide policies for congestion mitigation. The introduction of the RCAF 100 involves the addition of the following reference points:
Np: Between the RCAF 100 and the PCRF 102. Over Np, RUCI is sent from the RCAF 100 to the PCRF 102.
Nq/Nq': Via Nq, the MME 106a provides the RCAF 100 with the list of UEs (e.g., International Mobile Subscriber Identities (IMSIs)) in a given area (e.g. an Enhanced Node B (eNB) ID or an E-UTRAN Cell Global Identifier (ECGI) as disclosed in section 6.1.5.5.2.1 of 3GPP TR 23.705 v0.11.0) and for each of the IMSI(s) the Access Point Names (APNs) of the active Packet Data Network (PDN) 108 connections. The Nq' reference point is between the RCAF 100 and the SGSN 106b and is used, for a set of IMSI(s), to provide the RCAF 100 with the list of APNs of the active PDN 108 connections of each of these IMSIs.

Based on the parameters and their values received from the RAN OAM 104, the RCAF 100 reports a congestion level to the CN (e.g., to the PCRF 102). In accordance with the reported congestion level, the operator configures the mitigation policies in the CN.

RUCI is defined over the Np interface and includes the following information:
Congestion/abatement location information (e.g. eNB ID or Cell ID or 3G Service Area ID);
A congestion level;
The validity time of the information—when this time has elapsed and no further congestion information has been received, the congestion is assumed to be over; and
A list of IMSI(s) for the affected UEs.

The set of congestion mitigation actions that could be executed is not comprehensive, as only actions that are applied on the networks are considered.

Further, the PCRF 102 is not aware of:
The topology of the 3GPP and any alternative access networks—i.e., it does not know whether for a given cell there are alternative access networks for a UE or not; and
Which of the UEs included in the RUCI report for a given cell can actually switch access network.

SUMMARY

The inventors have appreciated that congestion mitigation actions typically considered for handling UPCON (e.g., traffic prioritization, traffic reduction and limitation of traffic) do not take into account the context associated to user equipments (UEs) in a congested area. For instance, congestion mitigation actions could be different depending on the application a given UE is using or frequently uses. For example, a given UE in a congested area could be using a peer-to-peer (P2P) application or a videoconferencing application; in the former case, severe traffic limitation mitigation actions could be taken while in the latter a not so severe mitigation action is required.

Further, the inventors have appreciated that congestion mitigation actions may be direct actions on a UE.

According to the invention in a first aspect, there is provided a network node in a telecommunications network. The network node comprises a receiving means, which may be a receiver, configured to receive congestion data identifying a congested area and one or more user equipments, UE, affected by the congested area. The network node comprises an alternative network determining means, which may be an alternative network determiner, configured to determine one or more switchable UEs, amongst the identified UEs, that may be offloaded to an alternative access network. The network node comprises a network switching means, which may be a network switcher, configured to control a transmitter to transmit an instruction for one or more of the switchable UEs to switch to an alternative access network.

Optionally, the alternative network determiner is configured to determine the switchable UEs based on a location of a UE, a location of an alternative access network and/or the capability of a UE to use an alternative access network.

Optionally, the network node further comprises a locator means, which may be a locator, configured to control the transmitter to transmit a request to a UE for data relating to the UE's location, wherein the receiver is configured to receive a response from the UE comprising data relating to the UE's location.

Optionally, the network node further comprises a UE context determining means, which may be a UE context determiner, configured to control the transmitter to transmit a request to a UE for data relating to a context of the UE, wherein the receiver is configured to receive a response from the UE comprising data relating to the UE's context.

Optionally, the data relating to the UE's context comprises one or more of: a current application running on the UE; a most recent application running on the UE; and a most frequently run application on the UE.

Optionally, the congestion data comprises Radio Access Network User Plane Congestion Information, RUCI, received from a further node for use as a Radio Access Network Congestion Awareness Function, RCAF.

Optionally, the network node is for use as a Policy and Charging Rules Function, PCRF.

Optionally, the alternative network determiner is configured to determine whether the congested area comprises an alternative access network.

Optionally, the alternative network determiner is configured to determine one or more candidate switchable UEs, amongst the identified UEs, that may be offloaded to the alternative access network, and wherein the network switcher is configured to control the transmitter to transmit towards a further node for use as an Access Network Discovery and selection Function, ANDSF, the instruction for the one or more of the candidate switchable UEs to switch to the alternative access network.

Optionally, the receiver is configured to receive from the ANDSF information relating to affected UEs that have been switched to the alternative access network and those that have not.

Optionally, the network node further comprises a mitigation controlling means, which may be a mitigation controller, configured to determine congestion mitigation policies for affected UEs that have not been switched to alternative access networks, and a mitigation instructing means, which may be a mitigation instructor, configured to control the transmitter to transmit the congestion mitigation policies to a Policy and Charging Enforcement Function, PCEF, in order to trigger corresponding congestion mitigation actions by the PCEF.

Optionally, the congestion data is received from a further network node for use as a Policy and Charging Rules Function, PCRF, the congestion data identifying one or more candidate switchable UEs that have a capability to switch to an alternative access network and an instruction to switch one or more of the candidate switchable UEs to an alternative access network, and wherein the alternative network determiner is configured to determine the switchable UEs based on a location of a candidate switchable UE and a location of an alternative access network.

Optionally, the network node is for use as an Access Network Discovery and selection Function, ANDSF.

Optionally, the transmitter is configured to transmit data to a further network node for use as a Policy and Charging Rules Function, PCRF, wherein the data comprises information relating to the affected UEs that have been switched to an alternative access network and those that have not.

Optionally, the data transmitted to the further node comprises data relating to the context of one or more UEs.

Optionally, the alternative network determiner is configured to determine whether an alternative access network is available in the congested area and to control the transmitter to transmit to a further node for use as a PCRF, data identifying whether an alternative access network is available in the congested area.

Optionally, the alternative network determiner is configured to control the transmitter to transmit to a further node for use as a PCRF, data identifying the one or more switchable UEs, and the receiver is configured to receive from the further network node for use as a PCRF, data identifying which of the one or more switchable UEs should be switched to an alternative access network.

Optionally, the transmitter is configured to transmit to a further network node for use as a PCRF, data relating to the UEs that have been switched to an alternative access network and/or those that have not.

Optionally, in advance of receiving the congestion data, the receiver is configured to receive a request from a further node for use as a PCRF, the request being for data relating to whether an alternative access network is available in one or more congested areas, and wherein the locator is configured to determine whether an alternative access network is available and to control the transmitter to transmit a response to the further network node accordingly.

According to the invention in a second aspect, there is provided a method for operating a network node in a telecommunications network. The method comprises receiving, at a receiver, congestion data identifying a congested area and one or more user equipments, UE, affected by the congested area. The method comprises determining, at an alternative network determiner, one or more switchable UEs, amongst the identified UEs, that may be offloaded to an alternative access network. The method comprises controlling, by a network switcher, a transmitter to transmit an instruction to one or more of the switchable UEs to switch to an alternative access network.

Optionally, the method further comprises determining, by the alternative network determiner, the switchable UEs based on a location of a UE, a location of an alternative access network and/or the capability of a UE to use an alternative access network.

Optionally, the method further comprises controlling, by a locator, the transmitter to transmit a request to a UE for data relating to the UE's location, and receiving, by the receiver, a response from the UE comprising data relating to the UE's location.

Optionally, the method further comprises controlling, by a UE context determiner, the transmitter to transmit a request to a UE for data relating to a context of the UE, and receiving, by the receiver, a response from the UE comprising data relating to the UE's context.

Optionally, the data relating to the UE's context comprises one or more of: a current application running on the UE; a most recent application running on the UE; and a most frequently run application on the UE.

Optionally, the congestion data comprises Radio Access Network User Plane Congestion Information, RUCI, received from a further node for use as a Radio Access Network Congestion Awareness Function, RCAF.

Optionally, the network node is for use as a Policy and Charging Rules Function, PCRF.

Optionally, the method further comprises determining, by the alternative network determiner, whether the congested area comprises an alternative access network.

Optionally, the method further comprises determining, by the alternative network determiner, one or more candidate switchable UEs, amongst the identified UEs, that may be offloaded to the alternative access network, and further comprises controlling, by the network switcher, the transmitter to transmit towards a further node for use as an Access Network Discovery and selection Function, ANDSF, the instruction for the one or more of the candidate switchable UEs to switch to the alternative access network.

Optionally, the method further comprises receiving, by the receiver from the ANDSF, information relating to affected UEs that have been switched to the alternative access network and those that have not.

Optionally, the method further comprises determining, by a mitigation controller, congestion mitigation policies for affected UEs that have not been switched to alternative access networks, and further comprises controlling, by a mitigation instructor, transmission by the transmitter of the congestion mitigation policies to a Policy and Charging Enforcement Function, PCEF, in order to trigger corresponding congestion mitigation actions by the PCEF.

Optionally, the congestion data is received from a further network node for use as a Policy and Charging Rules Function, PCRF, the congestion data identifying one or more candidate switchable UEs that have a capability to switch to an alternative access network and an instruction to switch one or more of the candidate switchable UEs to an alternative access network, and the method further comprises determining, by the alternative network determiner, the switchable UEs based on a location of a candidate switchable UE and a location of an alternative access network.

Optionally, the network node is for use as an Access Network Discovery and selection Function, ANDSF.

Optionally, the method further comprises transmitting, by the transmitter, data to a further network node for use as a Policy and Charging Rules Function, PCRF, wherein the data comprises information relating to the affected UEs that have been switched to an alternative access network and those that have not.

Optionally, the data transmitted to the further node comprises data relating to the context of one or more UEs.

Optionally, the method further comprises determining, by the alternative network determiner, whether an alternative access network is available in the congested area and controlling, by the alternative network determiner, the transmitter to transmit to a further node for use as a PCRF, data identifying whether an alternative access network is available in the congested area.

Optionally, the method further comprises controlling, by the alternative network determiner, the transmitter to transmit to a further node for use as a PCRF, data identifying the one or more switchable UEs, and further comprises receiving, by the receiver from the further network node for use as a PCRF, data identifying which of the one or more switchable UEs should be switched to an alternative access network.

Optionally, the method further comprises transmitting, by the transmitter to a further network node for use as a PCRF, data relating to the UEs that have been switched to an alternative access network and/or those that have not.

Optionally, in advance of receiving the congestion data, the receiver receives a request from a further node for use as a PCRF the request being for data relating to whether an alternative access network is available in one or more congested areas, and wherein the locator determines whether an alternative access network is available and controls the transmitter to transmit a response to the further network node accordingly.

According to the invention in a third aspect, there is provided a computer program comprising instructions which, when executed on at least one processor, cause the at least one processor to carry out the method disclosed above.

According to the invention in a fourth aspect, there is provided a carrier containing the computer program above, wherein the carrier is one of an electronic signal, optical signal, radio signal, or non-transitory computer readable storage medium.

BRIEF DESCRIPTION OF DRAWINGS

Exemplary embodiments of the invention are described below with reference to the accompanying drawings, in which.

DETAILED DESCRIPTION

Methods and apparatus disclosed herein seek to enhance the management of RAN user plane congestion situations. In known systems, when the PRCF receives a RUCI report from the RCAF containing an identifier of a located area (or cell) and a set of identifiers of UEs in the cell, it evaluates the available information, analyses, prioritizes and determines a congestion mitigation action (e.g., traffic prioritization, traffic reduction or limitation of traffic). Next, the PCRF contacts a Packet Data Network Gateway (PDN-GW), over the Gx reference point, instructing it to enforce a determined congestion mitigation action.

Figure 1:
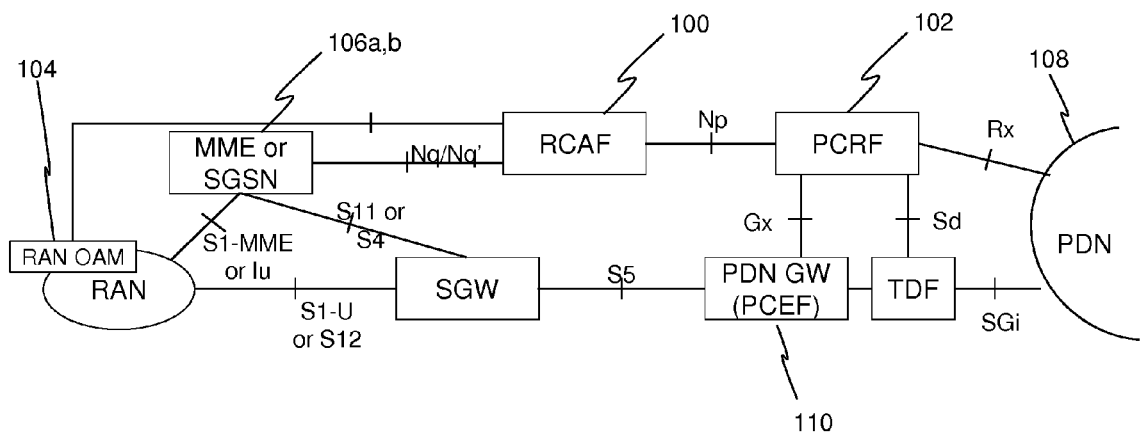
FIG. 1 is a block schematic architecture diagram of a telecommunications system.

The methods and apparatus disclosed obtain additional information from the UE for the PCRF to make a decision about the most appropriate congestion mitigation action. This may be done by contacting an Access Network Discovery and Selection Function (ANDSF) Server (not shown in FIG. 1) to request information about: a) generic availability of alternative access networks in a congested area; b) availability of alternative access networks for a specific UE (by implementing a simplified dialogue with the UE in order to get its location); c) the applications being run in the UE, the most used applications or any other UE-related information (by implementing a dialogue with the UE in order to get said information) that could be useful for making a decision.

Methods and apparatus disclosed herein may also provide UE access network switching as a congestion mitigation action that can be determined by the PCRF as the result of the congestion mitigation action evaluation process. To enforce this additional congestion mitigation action, the PCRF may contact the ANDSF Server instructing it to cause the UE to switch access network.

New functionalities may be implemented by the PCRF, the ANDSF Server, and an ANDSF Client (e.g., at a UE). New reference points (or updates to existing ones) are also introduced (between the PCRF and the ANDSF Server, between the ANDSF Server and the ANDSF Client, and between the RCAF and the ANDSF Server).

Methods and apparatus disclosed herein are broadly based on the principle that the PCRF is responsible for deciding which congestion mitigation action(s) should be taken if a RAN in a cell becomes congested and subsequently responsible for instructing one or more of the remaining policy enforcement points in the network to execute said congestion mitigation actions.

The functionality of the methods and apparatus disclosed herein depends on the entity that receives the RUCI reports, and on the way the PRCF and the ANDSF Server implement the new reference points. The PCRF plays an orchestration role in order to decide which mitigation actions have to be carried out by transmitting instructions to the relevant enforcement points: only the PDN GW (as in the current RAN Congestion Mitigation architecture); or one or both of the PDN GW and the UE (through the ANDSF Server) as disclosed herein.

Particular methods and apparatus comply with the 3GPP UPCON architecture. Additionally, other methods and apparatus not aligned with the 3GPP UPCON architecture are disclosed. The ANDSF Server may be the entity that receives congestion reports from the RCAF, and enriches said reports (including not only the list of UEs in a congested area, but also which of them can actually switch to alternative access networks) before forwarding them to the PCRF to let it make the final decision.

Methods and apparatus disclosed allow the possibility of enhancing the way that congestion in an RAN is mitigated by considering, as necessary, further information about the context of the UE. This invention also simplifies the way policy management is done in 3GPP networks when coping with congestion mitigation as the PCRF becomes the single policy orchestration node. Interworking of the ANDSF Server with rest of entities in 3GPP networks is also provided, so that it is no longer an isolated entity, but an integral part of policy management in 3GPP networks.

The ANDSF is an entity introduced by 3GPP as part of their Release 8 set of specifications, within an Evolved Packet Core (EPC) of the System Architecture Evolution (SAE) for 3GPP compliant mobile networks. The purpose of the ANDSF is to assist UE to discover non-3GPP access networks, such as Wireless Local Area Network (WLAN) or Worldwide Interoperability for Microwave Access (WI-MAX) that can be used for data communications in addition to 3GPP access networks, such as High Speed Packet Access (HSPA) or Long Term Evolution (LTE), and to provide the UE with rules policing the connection to these networks. 3GPP has not detailed how the ANDSF server interworks with the rest of the Evolved Packet Core (EPC) of the System Architecture Evolution (SAE). It has only defined a reference point linking the ANDSF with other entity, i.e. S14 between UE and ANDSF. Details about a node implementing the ANDSF functionality are specified in 3GPP specifications TS 23.402 and TS 24.302.

Although not mentioned in the specifications, ANDSF implementations are expected to manage geodetic information about the 3GPP locations (cells, for instance) and about the areas served by non-3GPP access networks. That is, the topology of the 3GPP and alternative access networks is known to the ANDSF Server.

Figure 2:
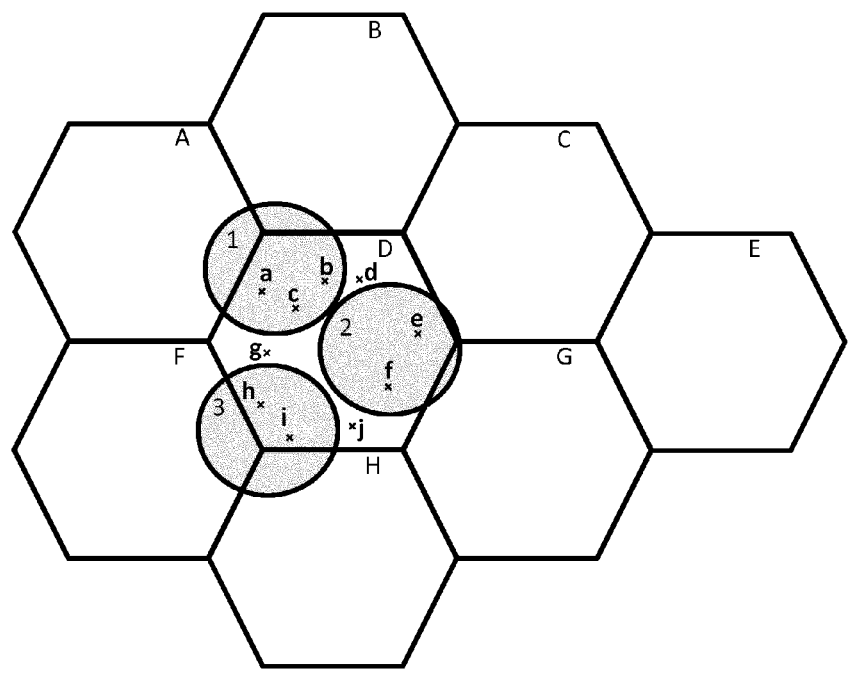
FIG. 2 is a schematic representation of UEs roaming in a plurality of adjacent cells or areas.

FIG. 2 shows a schematic representation of a plurality of adjacent cells. FIG. 2 introduces the concept of one or more areas that are served by alternative access networks. In FIG. 2, a set of 3GPP cells A, B, C, D, E, F, G, H (served each of them by a base station) are shown. FIG. 2 also shows three areas 1, 2, 3 served by alternative access networks (e.g., WiFi hotspots). Thus, cell D comprises three different areas 1, 2, 3 also served by an alternative access network. However, although there are alternative access networks in cell D, not the whole cell area is served by alternative access networks. On the other hand, there is no area served by an alternative access network in cell E.

An important point is that an entire cell may not be served by alternative access networks. In such cases, a UE in a congested cell may not be able to benefit from switching to an alternative access network, even if it is possible for other UEs in the same cell. This is shown in FIG. 2, in which UEs a, b, c, e, f, h, i are in locations in cell D that are served by alternative access networks, and could, if so desired, switch access network. UEs d, g, and j are in locations in cell D that are not served by alternative access networks and therefore cannot switch to an alternative access network even if desired.

The dialogue between the ANDSF Server and the ANDSF Client at the UE is implemented by means of the S14 reference point. The S14 reference point specifies two behaviors:

Pull mode: the UE determines that it needs new policies and sends a message to the ANDSF Server to require policies. This message includes its location. The ANDSF Server validates the request and sends the policies. The UE sends back a status message reporting the result of the application of the new policies.

Push mode: very similar to the pull mode, but with a preliminary step in which the ANDSF Server asks the UE to start the policy download process.

The ANDSF could determine the location of a given UE in one or both of two different ways:

Whenever the UE starts a dialogue with an ANDSF server, it sends its location.

Therefore, if the UE is configured to periodically poll the ANDSF Server for getting new policies it would send its location. The ANDSF may register the last known location of the UE in an internal storage.

The ANDSF Server might contact the UE, as in the push mode, and request its location. However, this process is typically always part of a complete policy push procedure. When the location is received, the ANDSF Server registers the last known location of the UE in an internal storage.

A reference point may be used between the ANDSF Server and the PCRF with the following functionality:

Upon reception of an indication of a failure when opening a new flow by a UE, the PCRF can asks the ANDSF Server, using a UE identifier, whether there is an alternative access network for the UE.

The ANDSF Server may respond with a list of available alternative access networks for the UE in its current location.

With such information the PCRF may decides which access network is suitable and send a prioritized list of alternative access networks to the ANDSF Server and the UE identifier that the list of access networks applies to.

Upon reception, the ANDSF Server starts a regular procedure to cause the UE to switch access network.

Moreover, information managed by the PCRF could trigger the ANDSF Server to initiate the provision of new access rules towards the UE. This might require introducing a mechanism for:

Downloading from ANDSF Server the list of available access networks in the surroundings of the UE.

Sending a list of preferred access networks to the ANDSF Server (to be sent further to the UE).

Making policy decisions to order the UE access through alternative access networks. Decision being based for example on current congestion level.

Disclosed herein are methods and apparatus for an enhanced procedure for the PCRF to apply congestion mitigation actions when receiving a RUCI report. For the purposes of this specification, a RUCI report comprises at least an identifier of a congested area or cell and identifiers of the UEs in the congested area. The procedure differs from the procedure described by the UPCON architecture in at least two ways: a) by retrieving extra information to make a decision on which congestion mitigation action(s) to take; and b) by introducing access network switching for a UE as a valid congestion mitigation action.

Figure 3:
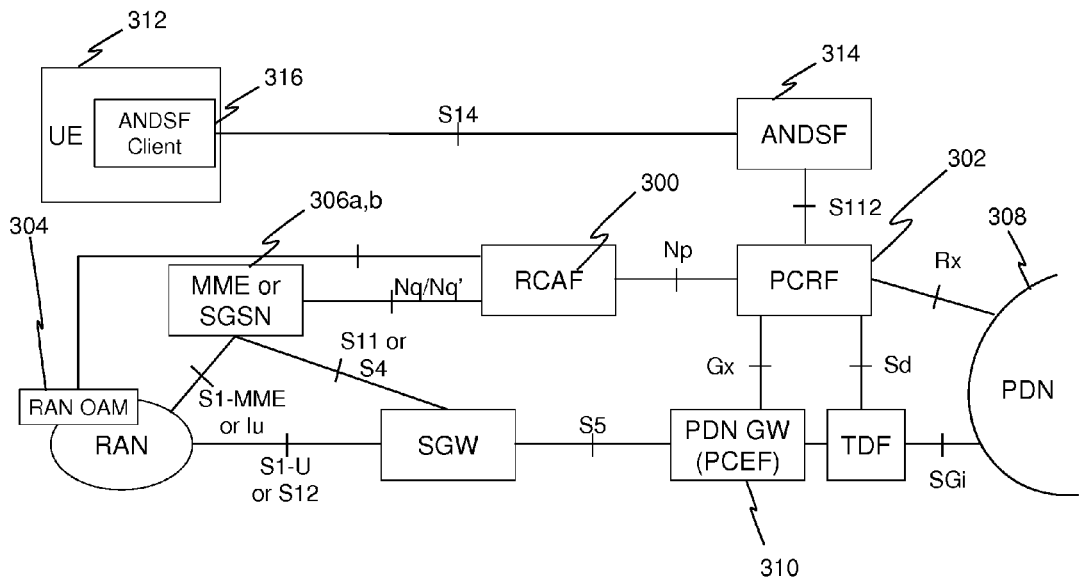
FIG. 3 is a block schematic architecture diagram of a telecommunications system.

FIG. 3 shows a block schematic architecture diagram of a telecommunication system for mitigation of RAN user plane congestion. FIG. 3 comprises the architecture shown in FIG. 1 and therefore similar features in FIG. 3 have the same references to those in FIG. 1 except that they begin with a '3' as opposed to a 't'. FIG. 3 also includes the additional features of a UE 312 and a ANDSF server 314. The UE comprises a ANDSF client 316. It is noted that any of the UEs a-j of FIG. 2 may be a UE 312.

The UE 312 and therefore the ANDSF client 316 is in electrical communication with the ANDSF server 314 via an S14 reference point. In addition, a new reference point, S112, provides electrical communication between the ANDSF server 314 and the PCRF 302. This new reference point enables the interworking of the ANDSF with the Evolved Packet Core (EPC) of the System Architecture Evolution (SAE).

Figure 4:
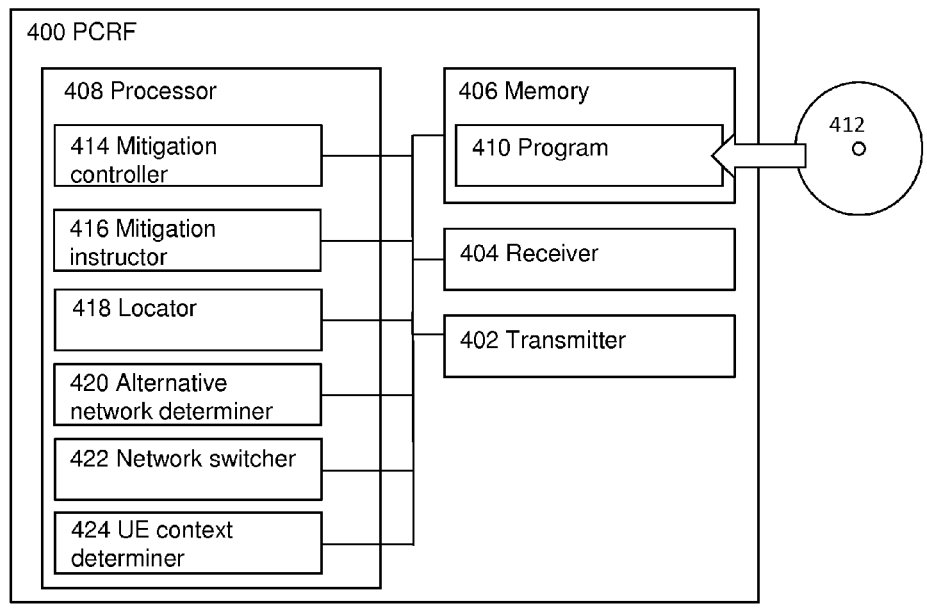
FIG. 4 is a schematic diagram of a network node for use as a PCRF.

FIG. 4 shows a schematic diagram of a network node 400. The network node 400 may be a PCRF 302.

The node 400 comprises a transmitter 402 and a receiver 404. The transmitter 402 and receiver 404 are in electrical communication with other communication units, nodes, UEs, servers and/or functions in a telecommunications network and are configured to transmit and receive data accordingly. Transmitter 402 and receiver 404 may be provided with a transceiver, not illustrated in the drawing, for transmitting and receiving data accordingly.

The node 400 further comprises at least one memory 406 and at least one processor 408. The memory 406 may comprise a non-volatile memory and/or a volatile memory. The memory 406 may have a computer program 410 stored therein. The computer program 410 may be configured to undertake the methods disclosed herein. The computer program 410 may be loaded in the memory 406 from a non-transitory computer readable medium 412, on which the computer program is stored. The processor 408 is configured to undertake at least the functions of mitigation controller 414, mitigation instructor 416, locator 418, alternative network determiner 420, network switcher 422 and a UE context determiner 424, as set out herein.

Each of the transmitter 402 and receiver 404, memory 406, processor 408, mitigation controller 414, mitigation instructor 416, locator 418, alternative network determiner 420, network switcher 422 and a UE context determiner 424 is in electrical communication with the other features of the node 400. The node 400 can be implemented as a combination of computer hardware and software. In particular, the mitigation controller 414, mitigation instructor 416, locator 418, alternative network determiner 420, network switcher 422 and a UE context determiner 424 may be implemented as software configured to run on the processor 408. The at least one memory 406 stores the various programs or executable files that are implemented by a processor 408, and also provides a storage unit for any required data. The programs or executable files stored in the memory 406, and implemented by the processor 408, can include the mitigation controller 414, mitigation instructor 416, locator 418, alternative network determiner 420, network switcher 422 and a UE context determiner 424 but are not limited to such.

Figure 5:
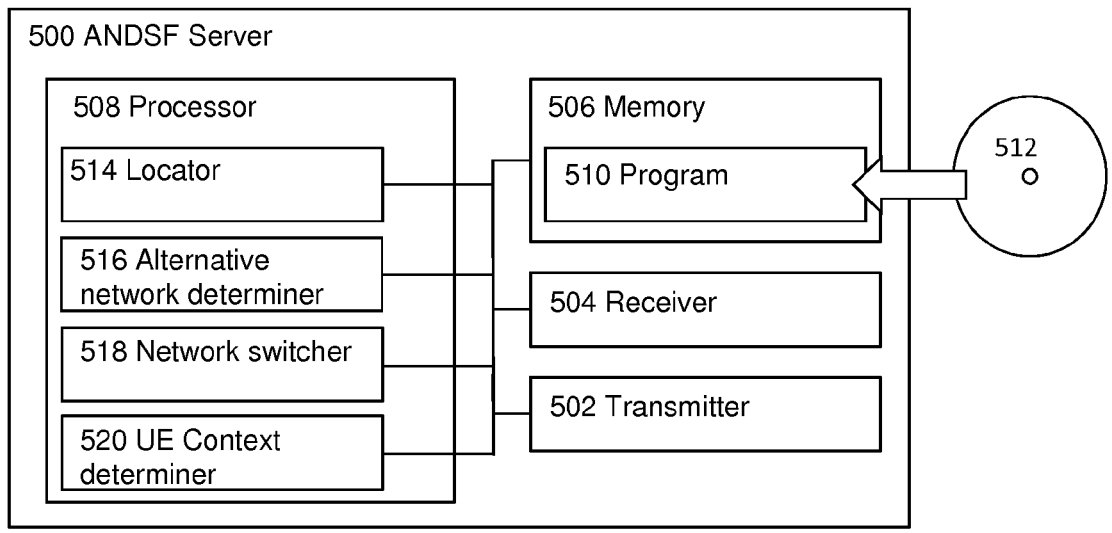
FIG. 5 is a schematic diagram of a network node for use as an ANDSF server.

FIG. 5 shows a schematic diagram of a network node 500. The network node 500 may comprise an ANDSF Server 314.

The network node 500 comprises a transmitter 502 and a receiver 504. The transmitter 502 and receiver 504 are in electrical communication with other communication units, nodes, UEs, servers and/or functions in a telecommunications network and are configured to transmit and receive data accordingly. Transmitter 502 and receiver 504 may be provided with a transceiver, not illustrated in the drawing, for transmitting and receiving data accordingly.

The network node 500 further comprises at least one memory 506 and at least one processor 508. The memory 506 may comprise a non-volatile memory and/or a volatile memory. The memory 506 may have a computer program 510 stored therein. The computer program 510 may be configured to undertake the methods disclosed herein. The computer program 510 may be loaded in the memory 506 from a non-transitory computer readable medium 512, on which the computer program is stored. The processor 508 is configured to undertake at least the functions of a locator 514, an alternative network determiner 516, a network switcher 518 and a UE context determiner 520, as set out herein.

Each of the transmitter 502 and receiver 504, memory 506, processor 508, locator 514, alternative network determiner 516, network switcher 518 and UE context determiner 520 is in electrical communication with the other features of the node 500. The node 500 can be implemented as a combination of computer hardware and software. In particular, the locator 514, alternative network determiner 516, network switcher 518 and UE context determiner 520 may be implemented as software configured to run on the processor 508. The at least one memory 506 stores the various programs or executable files that are implemented by a processor 508, and also provides a storage unit for any required data. The programs or executable files stored in the memory 506, and implemented by the processor 508, can include the locator 514, alternative network determiner 516, network switcher 518 and UE context determiner 520, but are not limited to such.

Figure 6:
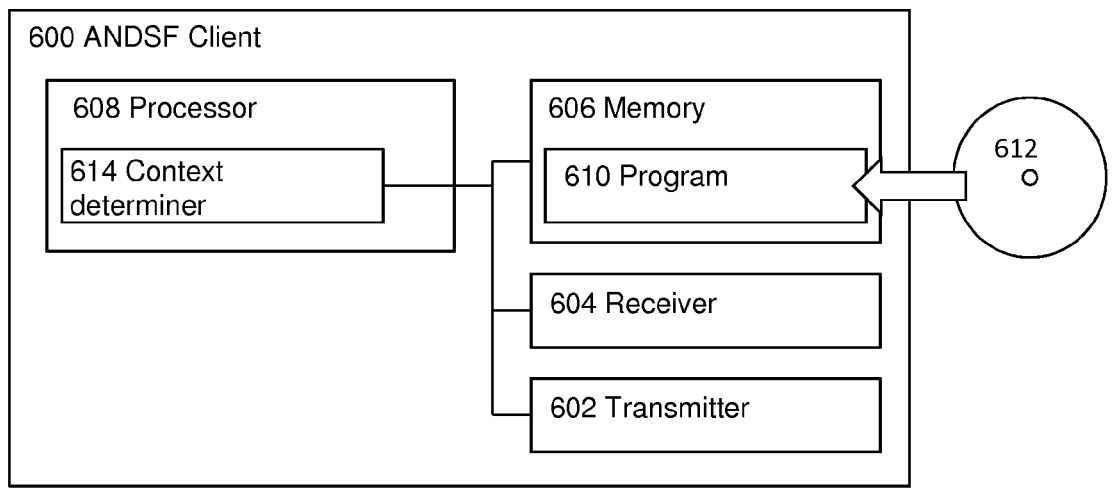
FIG. 6 is a schematic diagram of a network node for use as an ANDSF client.

FIG. 6 shows a schematic diagram of a network node 600. The network node 600 may comprise a ANDSF Client 316.

The network node 600 comprises a transmitter 602 and a receiver 604. The transmitter 602 and receiver 604 are in electrical communication with other communication units, nodes, UEs, servers and/or functions in a telecommunications network and are configured to transmit and receive data accordingly. Transmitter 602 and receiver 604 may be provided with a transceiver, not illustrated in the drawing, for transmitting and receiving data accordingly.

The network node 600 further comprises at least one memory 606 and at least one processor 608. The memory 606 may comprise a non-volatile memory and/or a volatile memory. The memory 606 may have a computer program 610 stored therein. The computer program 610 may be configured to undertake the methods disclosed herein. The computer program 610 may be loaded in the memory 606 from a non-transitory computer readable medium 612, on which the computer program is stored. The processor 608 is configured to undertake at least the functions of a context determiner 614, as set out herein.

Each of the transmitter 602 and receiver 604, memory 606, processor 608, context determiner 614 is in electrical communication with the other features of the node 600. The node 600 can be implemented as a combination of computer hardware and software. In particular, the context determiner 614 may be implemented as software configured to run on the processor 608. The at least one memory 606 stores the various programs or executable files that are implemented by a processor 608, and also provides a storage unit for any required data. The programs or executable files stored in the memory 606, and implemented by the processor 608, can include the context determiner 614, but are not limited to such.

Broadly, methods disclosed herein may be defined as follows:

When making a decision about what to do with a UE 312 in a congested area, the PCRF 302 considers access network switching as a valid congestion mitigation action.

If not known when making a decision for a given UE 312, the PCRF 302 can query the ANDSF Server 314 to find out the following information:

For a given congested area A-H, whether there is any available alternative access network 1-3.

For a given UE 312 in a given congested area A-H, whether there is any available alternative access network 1-3.

For a given UE 312 in a given congested area A-H, which applications are being used and/or are more frequently used and/or any other UE-related information.

The PCRF 302 uses the information about available alternative access networks 1-3 and the applications being used by each UE 312, as well as any other UE-related information, as inputs for the policy evaluation process to analyze and prioritize congestion mitigation actions for one or more UEs 312 in a congested area A-H.

Once the evaluation process has been carried out, the PCRF 302 will decide which congestion mitigation action to execute for each UE 312. For example, traffic prioritization, traffic reduction and limitation of traffic are currently enforced by means of the Gx reference point from the PCRF 302 to the PDN GW 310. This is the regular behaviour of the PCRF 302. Offloading to an alternative access network 1-3, as provided for in this specification, is implemented by means of the ANDSF Server 314. Where offloading cannot be carried out for some UEs, the regular behaviour may be followed for such some UEs.

To support the aforementioned functionality in the PCRF 302, this invention proposes new functionalities in the ANDSF Server 314:

The ANDSF Server 314 stores a description of the topology of the access networks in terms of cells and areas A-H served by alternative access networks 1-3. The ANDSF Server 314 is therefore able to answer queries about the availability of alternative access networks 1-3 in a given cell A-H. An alternative embodiment would consider that this information could be cached or duplicated in the PCRF 302.

The ANDSF Server 314 may implement a procedure to ask for the location of a given UE 312. This procedure may be based on the currently existing S14 reference point. The S14 reference point specification proposes two modes: pull and push. In the pull mode, the UE 312 decides that it needs new policies and sends a message to the ANDSF Server 314 to require policies. This message includes its location. The push mode is mainly the same, but with a preliminary step in which the ANDSF Server asks the UE 312 to start the policy download process. An embodiment proposes to reuse this first message of a push scenario and the subsequent answer. The ANDSF Server 314 is thereby able to obtain the location of the UE 312 in order to determine whether it can be served by an alternative access network 1-3 or not by comparing its location with the areas served by alternative access networks 1-3 available at the ANDSF Server 314.

The ANDSF Server 314 may be able to implement an enhanced procedure to request not only the location of a given UE 314 (as described in the previous item), but also information about the last executed applications and/or any other UE-related information. This procedure involves the update of the ANDSF Client 316 at the UE 312. This enhances the procedure described in the previous item and includes in a response from the UE 312 to the ANDSF Server 314 a code (or codes) identifying the last used application(s) and/or any other UE-related information.

The ANDSF Server 314 may be configured to record, whenever it starts a dialogue with a UE 312, the location of the UE 312 (and optionally to discard it after a predefined time). Therefore, the last known location of a UE 312 will be available and used if considered 'fresh' enough instead of starting a location lookup dialogue with the UE 312 every time UE location is required. The ANDSF Server 314 is able to store also the per-UE list of the last used applications, as well as any other UE-related information, to be sent back to the PCRF 302 if that list also is 'fresh' enough.

When queried by the PCRF 302, the ANDSF Server 314 is able to include in a response not only the information about per-UE available access networks but also the last used application in each UE 312 and/or any other UE-related information.

A new reference point between the PCRF 302 and the ANDSF Server 314 is introduced and referred to herein as the S112 reference point. It is an add-on to the UPCON architecture described in section 6.1.5.5 in 3GPP TR 23.705. This new reference point supports two main functionalities:

It allows the PCRF 302 to request from the ANDSF Server 314 information that can be used to enhance the policy evaluation process in congestion situations.

It allows the PCRF 302 to control the ANDSF Server 314, to request that a given UE 312 switches access network and to report the result of the switching.

The functionality described in the previous section is implemented by means of a new reference point, named S112, between the ANDSF Server 314 and the PCRF 302. As described above, the UPCON architecture introduces a new logical function entity, the RCAF 300, which is able to report RUCI to the PCRF 302 for the purpose of congestion mitigation. For this purpose the RCAF 300 is able to determine a list of UEs 312 impacted by a sustained congestion situation and to report such a congestion situation through the Np reference point. The information passed on through this reference point (e.g. the RUCI) includes the following items: congestion/abatement location information (that is, the congested area location, e.g. eNB ID or Cell ID or 3G Service Area ID); congestion level data; validity time of the information; and the IMSI of all the affected UEs.

Depending on what the PCRF 302 does upon reception of a RUCI report, different methodologies or combinations thereof may be employed.

The PCRF 302 may analyse and prioritize congestion mitigation actions considering only the RUCI report and its internal configuration. For those UEs 312 that could switch access network, the PCRF 302 contacts the ANDSF Server 314 requesting that the UEs switch access network.

The PCRF 302 may query the ANDSF Server 314 in order to know whether there are alternative access networks 1-3 in the congested location. Next, the PCRF 302 determines congestion mitigation actions and for those UEs 312 that could switch access network, the PCRF 302 contacts again the ANDSF Server 314.

The PCRF 302 may query the ANDSF Server 314 first in order to know the UE context (e.g., the last used application) before determining any congestion mitigation action.

Figure 7:
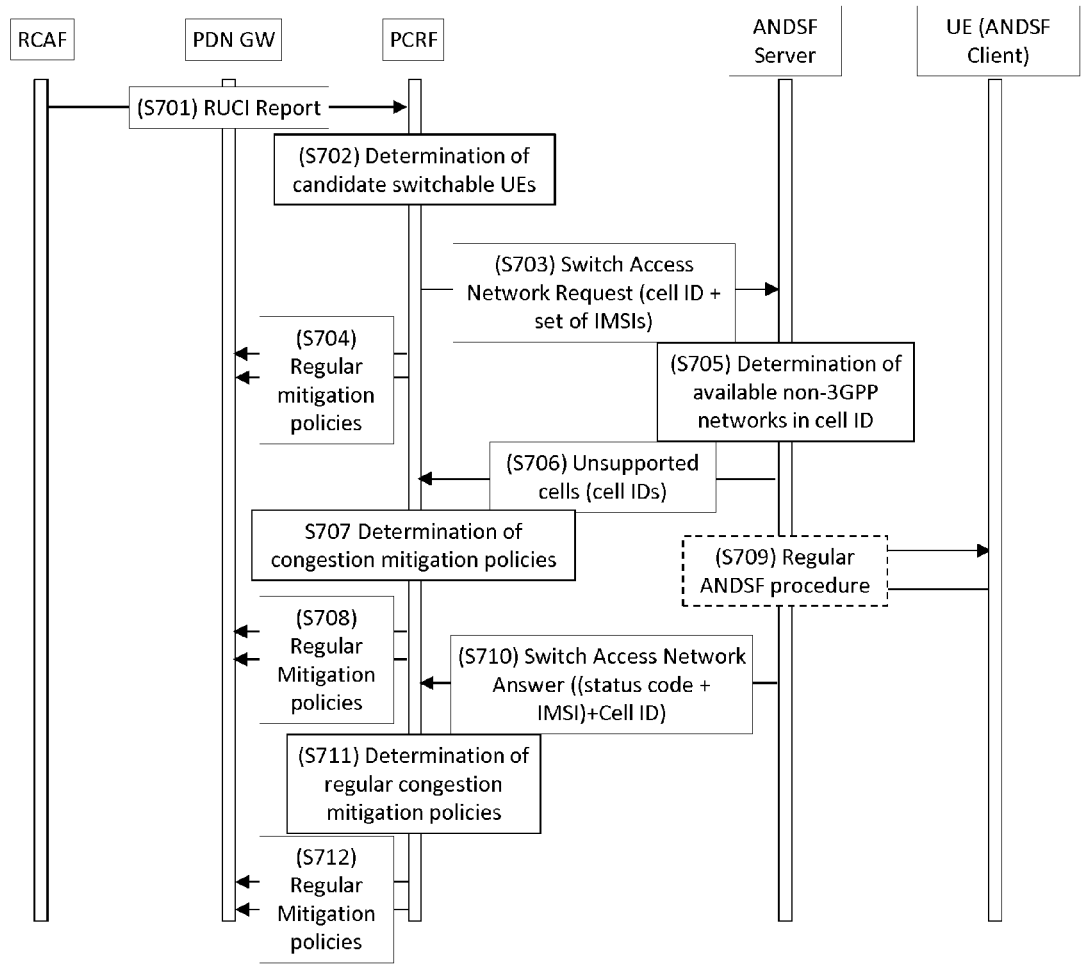
FIG. 7 is a signalling diagram showing a methodology for mitigating congestion.

Referring to FIG. 7, a signalling diagram showing an exemplary methodology for mitigating congestion is shown.

The RCAF 100 sends S701 a RUCI report to the PCRF 302. This report comprises, for each congested location, location information (for instance, the Cell ID), the severity of the congestion situation, the validity of the congestion situation (e.g., in terms of time and how old it is) and a list of affected UEs 312, each identified by means of the IMSI. This is the regular behaviour of the current RAN User Plane Congestion architecture.

Upon reception of the RUCI report, and according to its internal configuration and to the profile of each subscriber, the PCRF 302 determines S702 a set of candidate switchable UEs 312 that are technically capable of switching access network in order to avoid the congestion situation provided that there is an alternative access network. In this sense, technically capable may mean that the UE comprises the necessary hardware, firmware and/or software to use an alternative access network. The set of candidate switchable UEs 312 is a subset of all the UEs 312 included in the RUCI report. For the remaining UEs 312, the procedure will be the same as with the current UPCON proposal (determining congestion mitigation policies and sending S704 the congestion mitigation policies to the PDN GW 310).

Next, the PCRF 302 sends S703 a message over the S112 reference point to the ANDSF Server 314. This message includes the congestion location information (i.e. the Cell ID) and the list of IMSI identifying the candidate switchable UEs 312 that could switch access network, if one is available. In an alternative implementation, the PCRF 302 could include a prioritized list of available access networks that each UE 312 should switch to.

Upon reception of the query, the ANDSF 314 Server determines S705 whether there is an alternative non-3GPP access network 1-3 for the congested area(s) whose location information is provided by the PCRF 302 in S703. It may do so by querying its internal geodetic information. As a result, the ANDSF Server 314 sends S706 back a list of identifiers of the cells A-H without any alternative access network.

With the information received in S706, and according to its internal configuration and to the profile of each subscriber, the PCRF 302 determines S707, for the UE 312 in the cells identified in S706, the relevant congestion mitigation policies. The procedure will be the same as with the current UPCON proposal (sending S708 the congestion mitigation policies to the PDN GW 310).

At the same time, the ANDSF Server 314 may carry out S709 an ANDSF procedure for every UE 312 located in the cells with an alternative access network. To this end, the ANDSF 314 may determine one or more switchable UEs from the candidate switchable UEs. The determination may be based on the location of the UE, the location of an alternative access network and/or context information for the UE. The ANDSF Server 314 may then control the switchable UEs to switch to an alternative access network.

The ANDSF Server 314 sends S710 back a report that includes the list of UEs 312, the cell ID and the result of the ANDSF procedure for each of them. Reports can contain the results for one or a group of UEs.

For those UEs which have not been able to switch access network, the PCRF 302 determines S711 regular congestion mitigation policies, for each UE, and sends S712 the congestion mitigation policies to the PDN GW (109).

The above method introduces the S112 reference point. No update in the S14 reference point is proposed in this embodiment.

Figure 8:
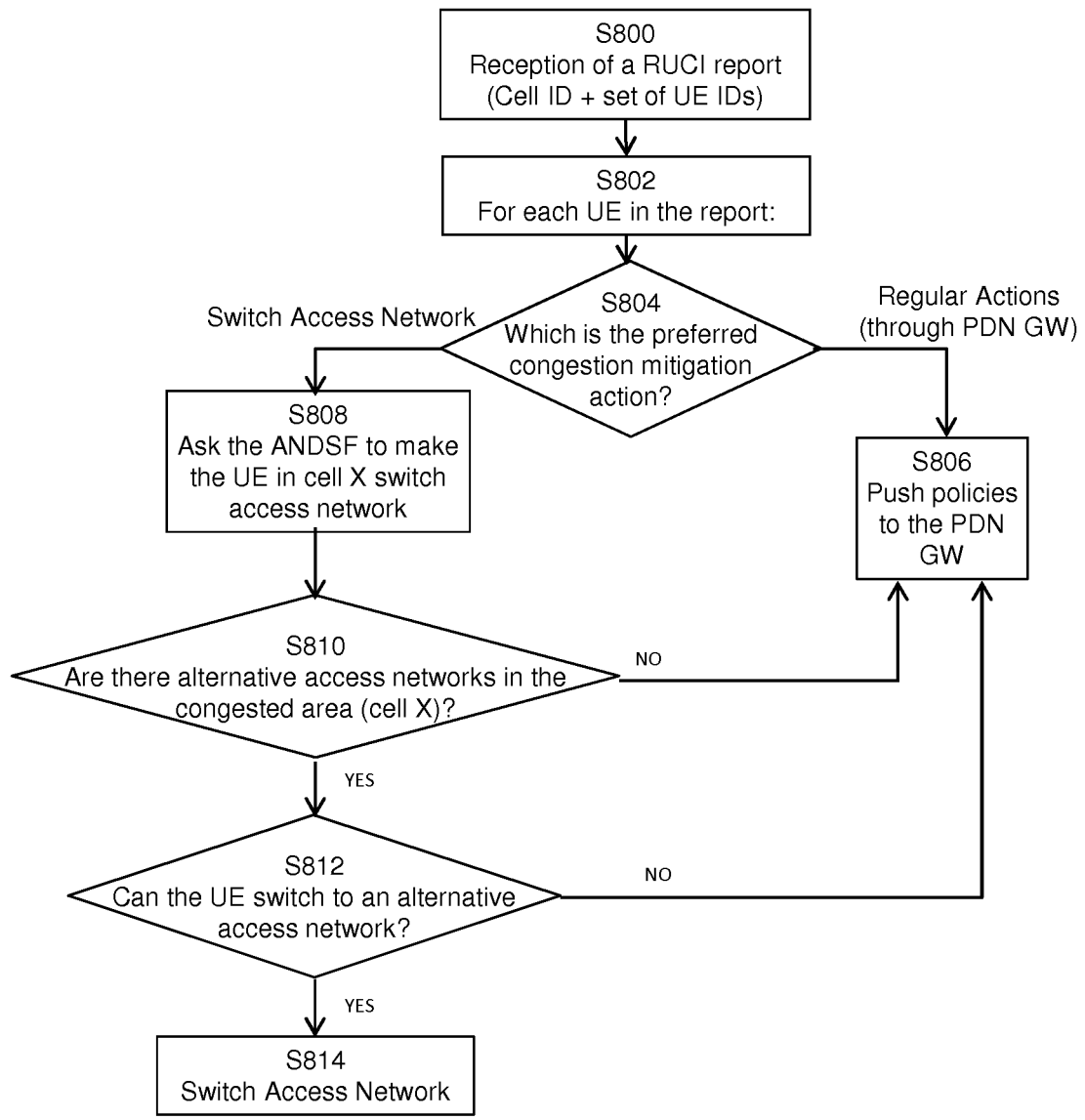
FIG. 8 is a flow diagram showing a method for mitigating congestion.

FIG. 8 is a flow diagram showing an exemplary method for mitigating congestion. The receiver 404 of the PCRF 302 receives S800 the RUCI from the RCAF 300. The alternative network determiner 420 determines S802, S804 for one or more UEs 312 in the RUCI whether access network switching is desired if an alternative access network is available and/or whether the UE is capable of switching. The alternative network determiner 420 thereby determines a candidate switching set of UEs 312.

If regular actions are to be taken for a UE (i.e., it is not in the candidate switching set), the mitigation controller 414 determines congestion mitigation policies for such UE and the mitigation instructor 416 controls the transmitter 402 to transmit (push) S806 the congestion mitigation policies to the PDN GW 310.

If access network switching is determined to be desired for a UE (i.e., it is in the candidate switching set), the network switcher 422 controls the transmitter 402 of the PCRF 302 to transmit S808 instructions to the ANDSF Server 314 to control the UE to switch access network, if one is available.

The locator 514 of the ANDSF Server 314 determines S810 whether there are alternative access networks in the congested cell A-H. If there are no alternative access networks available, the locator 514 controls the transmitter 502 to transmit that information to the PCRF 302, the mitigation controller 414 determines congestion mitigation policies and the mitigation instructor 416 controls the transmitter 402 to transmit (push) S806 the congestion mitigation policies to the PDN GW 310. If alternative access networks are available, the alternative access network determiner 516 determines S812 whether the UE is able to switch to an alternative access network. If the UE cannot switch to an alternative access network, the locator 514 controls the transmitter 502 to transmit that information to the PCRF 302, the mitigation controller 414 determines congestion mitigation policies and the mitigation instructor 416 controls the transmitter 402 to transmit (push) S806 the congestion mitigation policies to the PDN GW 310. If the UE can switch to an alternative access network, the network switcher 518 controls the transmitter 502 to transmit S814 instructions to the UE 312 (and the ANDSF client 316) to switch access network.

Figure 9:
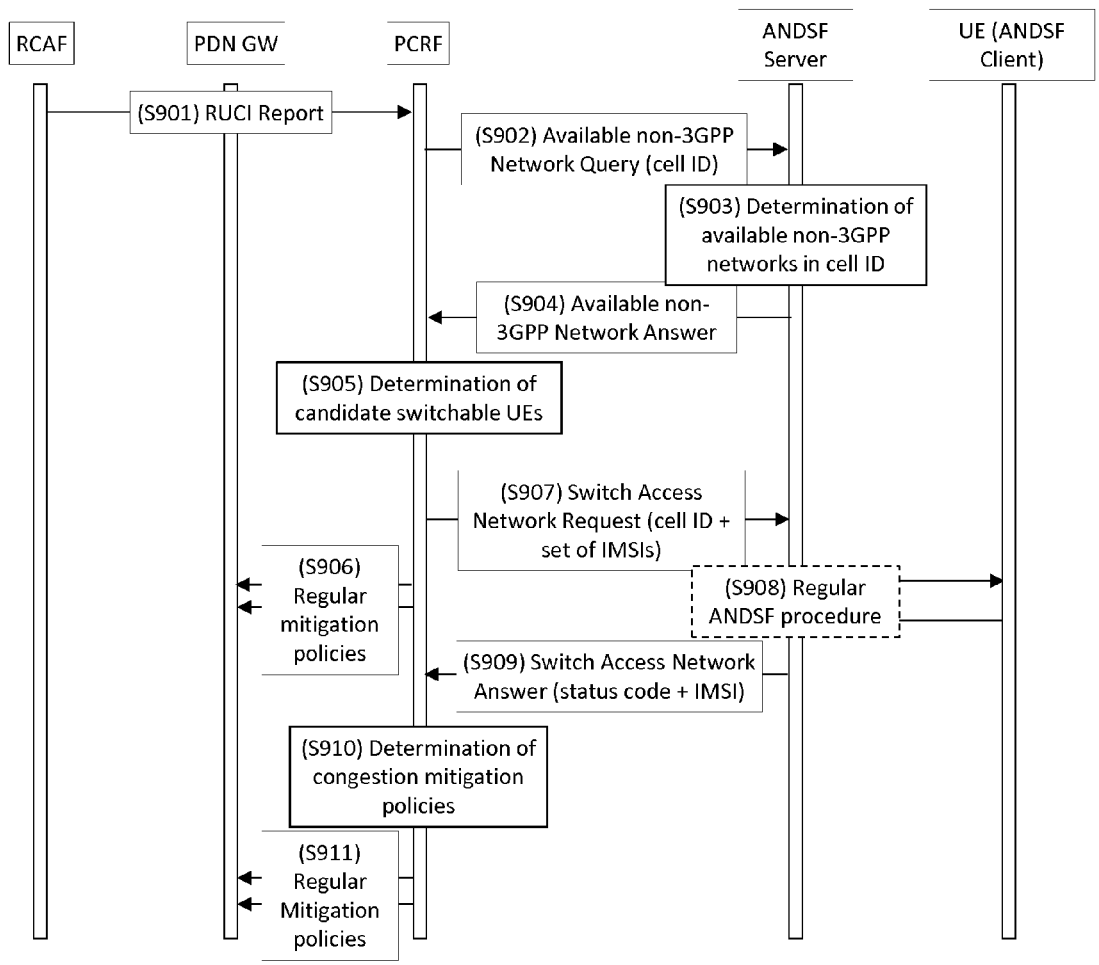
FIG. 9 is a signalling diagram showing a methodology for mitigating congestion.

Referring to FIG. 9, a signalling diagram showing an exemplary methodology for mitigating congestion is shown.

The RCAF 300 sends S901 a RUCI report to the PCRF 302. This report contains, for each congested location, location information (for instance, the Cell Id), the severity of the congestion situation, the validity of the congestion situation and the list of affected UEs 312 (each of them identified by means of the IMSI). This is the regular behaviour of the current RAN User Plane Congestion architecture.

Upon reception of the RUCI report, the alternative network determiner 420 of the PCRF 302 controls the transmitter 402 to transmit S902 a query over the S112 reference point to the ANDSF Server 314 including the congestion location information (i.e., the Cell ID) (201) in order to know whether there are alternative access networks for said areas.

Upon reception of the query, the alternative network determiner 516 of the ANDSF Server 314 determines S903 whether there is an alternative non-3GPP access network for the congested area whose location information is provided by the PCRF 302 in S902. It may do so by querying its internal geodetic information. The alternative network determiner 516 controls the transmitter 502 of the ANDSF Server 314 to respond S904 with an ACK if an alternative access network is available or with a NOK answer if no alternative access network is available. The ANDSF Server 314 can include in the response S904 a list of available access networks to enable the PCRF 302 to make further policy decisions.

With the information received in S904, and according to its internal configuration and to the profile of each subscriber, the alternative network determiner 420 of the PCRF 302 determines S905, for each congested location, a candidate switching set of UEs 312 that might switch access network in order to avoid the congestion situation provided that there is an alternative access network. The candidate switching set of UEs is a subset of the affected UEs included in the RUCI report. For the remaining UEs, the procedure will be the same as with the current UPCON proposal (determining and sending S906, respectively by the mitigation controller 414 and the mitigation instructor 416, the corresponding congestion mitigation policies to the PDN GW 310).

Next, the network switcher 422 of the PCRF 302 controls the transmitter 402 to send S907 a message over the S112 reference point to the ANDSF Server 314. The message includes the congestion location information (i.e. the Cell ID) and the list of IMSI that identify the UEs in the switching set. The PCRF 302 could include a prioritized list of available access networks each UE should switch to.

The ANDSF Server 314 carries out S908 an ANDSF procedure for every UE located in the area identified by means of the Cell ID. Then, the transmitter 502 of the ANDSF Server 314 sends S909 a report to the PCRF 302. The report includes a list of UEs and the result of the ANDSF procedure for each of them. Reports can contain the results for one or a group of UEs.

For those UEs which have not been able to switch access network, the mitigation controller 414 of the PCRF 302 determines S910 regular congestion mitigation policies, for each UE, and the mitigation instructor 416 sends S911 through the transmitter 402 the congestion mitigation policies to the PDN GW 310.

Figure 10:
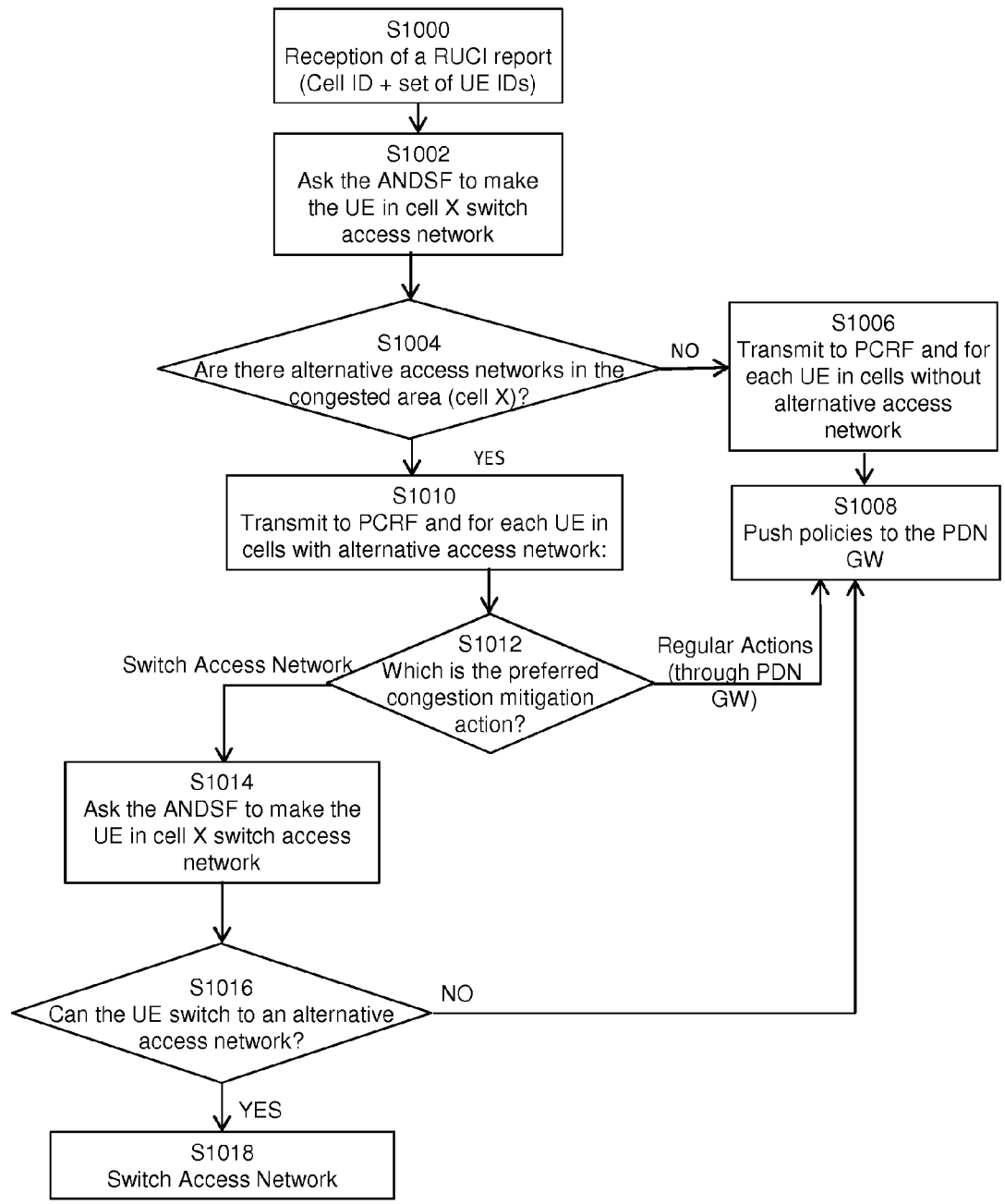
FIG. 10 is a flow diagram showing a method for mitigating congestion.

FIG. 10 is a flow chart of an exemplary method for mitigating congestion.

The receiver 404 of the PCRF 302 receives S1000 the RUCI from the RCAF 300. The alternative network determiner 420 controls the transmitter 402 to transmit S1002 a message to the ANDSF Server 314 to request information on whether alternative access networks are available in a congested area. The locator 514 of the ANDSF Server 314 determines S1004 whether an alternative access network is available in the congested area.

If no alternative access network is available, the locator 514 controls the transmitter 502 to transmit S1006 a suitable response to the PCRF 302. The mitigation controller 414 determines congestion mitigation policies and the mitigation instructor 416 controls the transmitter 402 to transmit (push) S1008 the congestion mitigation policies to the PDN GW 310.

If an alternative access network is available, the locator 514 controls the transmitter 502 to transmit S1010 a suitable response to the PCRF 302. The mitigation controller 414 in an embodiment, or the alternative network determiner 420 in another, determines S1012 which is the best mitigation action for the candidate switchable UEs that may be switched to an alternative access network for a congested area. If regular congestion mitigation actions are to be taken, the mitigation controller 414 determines congestion mitigation policies, and the mitigation instructor 416 controls the transmitter 402 to transmit (push) S1008 the congestion mitigation policies to the PDN GW 310. If access network switching is determined to be the best congestion mitigation action, the network switcher 422 controls the transmitter 402 to send S1014 a message to the ANDSF Server 314 containing a list of IMSIs identifying the candidate switchable UEs to be switched. The alternative network determiner 516 of the ANDSF Server 314 determines S1016 whether one or more of the candidate switchable UEs can switch to an alternative access network (i.e. they are actually switchable). If not, this is reported to the PCRF 302, the mitigation controller 414 determines congestion mitigation policies, and the mitigation instructor 416 controls the transmitter 402 to transmit (push) S1008 the congestion mitigation policies to the PDN GW 310. If a candidate switchable UE can switch access network, the network switcher 518 of the ANDSF Server 314 controls the transmitter 502 of the ANDSF Server 312 to transmit S1018 instructions to the UE 312 (and the ANDSF client 316) to switch access network.

Figure 11:
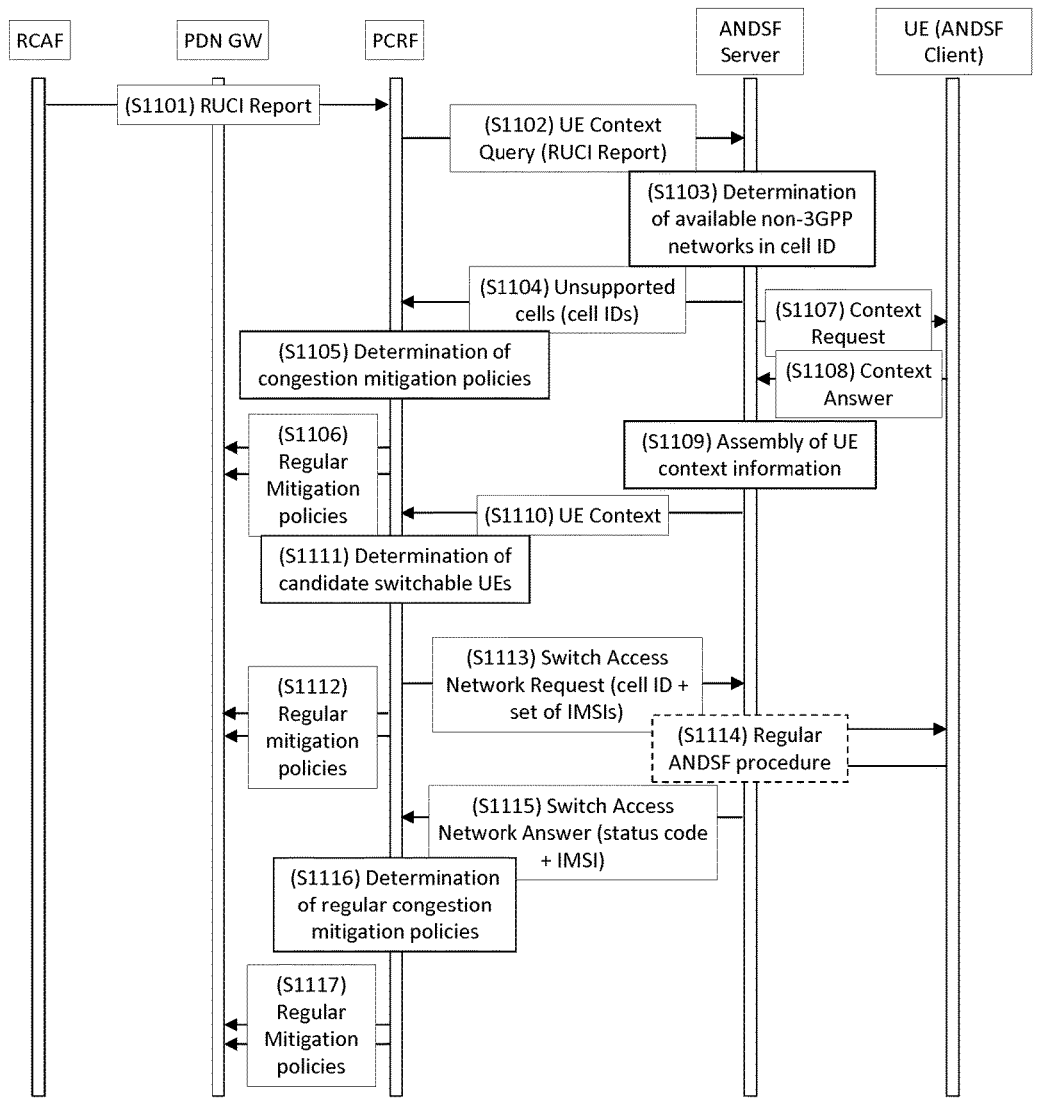
FIG. 11 is a signalling diagram showing a methodology for mitigating congestion.

Referring to FIG. 11, a signalling diagram showing an exemplary methodology for mitigating congestion is shown.

The RCAF 300 sends S1101 a RUCI report to the PCRF 302. The RUCI report contains, for each congested location, location information (for instance, the Cell ID), the severity of the congestion situation, the validity of the congestion situation and the list of affected UEs (each of them identified by means of the IMSI). This is the regular behaviour of the current RAN User Plane Congestion architecture.

Upon reception of the RUCI report, the PCRF 302 sends S1102 a query over the S112 reference point to the ANDSF Server 314 including the congestion location information (i.e., the Cell ID) and the identifiers of the UEs affected by the congestion and included in the RUCI report.

Upon reception of the query, the ANDSF Server 314 determines S1103 first whether there is an alternative non-3GPP access network for the congested areas whose location information is provided by the PCRF in S1102. It may do so by querying its internal geodetic information. As a result, the ANDSF Server sends S1104 to the PCRF 302 a list of pairs comprising cell ID and availability of alternative access networks.

With the information received in S1104, and according to its internal configuration and to the profile of each subscriber, the mitigation controller 414 of the PCRF 302 determines S1105, for the UEs in the congested locations without alternative access networks, the congestion mitigation policies. The procedure will be the same as with the current UPCON proposal (the mitigation instructor 416 controls the transmitter 402 to transmit (push) S1106 the corresponding congestion mitigation policies to the PDN GW 310).

At the same time, the ANDSF Server 314 queries S1107 the remaining UEs (that is, those UEs belonging to areas with alternative access networks) in order to get their location. The ANDSF Server 314 in S1107 may also request a list of applications being used or that are more frequently used by the UE and/or any other UE-related information. This may require an enhanced ANDSF Client 316 at the UE 312. The ANDSF Server 314 can choose to interrogate only those UEs whose location is not registered in the ANDSF Server 314 or, if registered, not fresh (or recent) enough. The same applies to the application information and/or any other UE-related information for a UE. The UEs send S1108 their location and/or application information and/or any other UE-related information to the ANDSF Server.

Depending on UE location, the ANDSF Server 314 determines whether the UE is in an area actually served by an alternative access network by comparing the UE location with the static information it stores about the areas served by alternative access networks. For each UE, a message is assembled S1109 containing a flag stating whether an alternative access network is available or not and, optionally, a list of applications used or more frequently used by the UE and/or any other UE-related information. This information is sent S1110 to the PCRF 302. The ANDSF Server 314 can include in S1110 a per-UE list of available access networks to enable the PCRF 302 to make further policy decisions.

With the information received in S1110, and according to its internal configuration and to the profile of each subscriber, the PCRF 302 determines S1111 the set of UEs that might switch access network in order to avoid the congestion situation. This set of UEs is a subset of all the UEs included in the message S1110. For the remaining UEs, the procedure will be the same as with the current UPCON proposal (determining and sending S1112 the corresponding congestion mitigation policies to the PDN GW 302).

Next, the PCRF 302 sends S1113 a message over the S112 reference point to the ANDSF Server 314. It includes the list of IMSI that identify the affected UEs that could switch access network.

The ANDSF Server 314 carries out S1114 an ANDSF procedure for every UE. Then, the ANDSF Server 314 sends S1115 a report to the PCRF 302. The report includes the list of UEs and the result of the ANDSF procedure for each of them. Reports can contain the results for one or a group of UEs.

For those UEs which have not been able to switch access network, the PCRF 302 determines S1116 regular congestion mitigation policies for each UE and sends S1117 the congestion mitigation policies to the PDN GW 310.

The above methodology provides an update to the S14 interface to get the UE location and information about the status and context of the UE.

Figure 12:
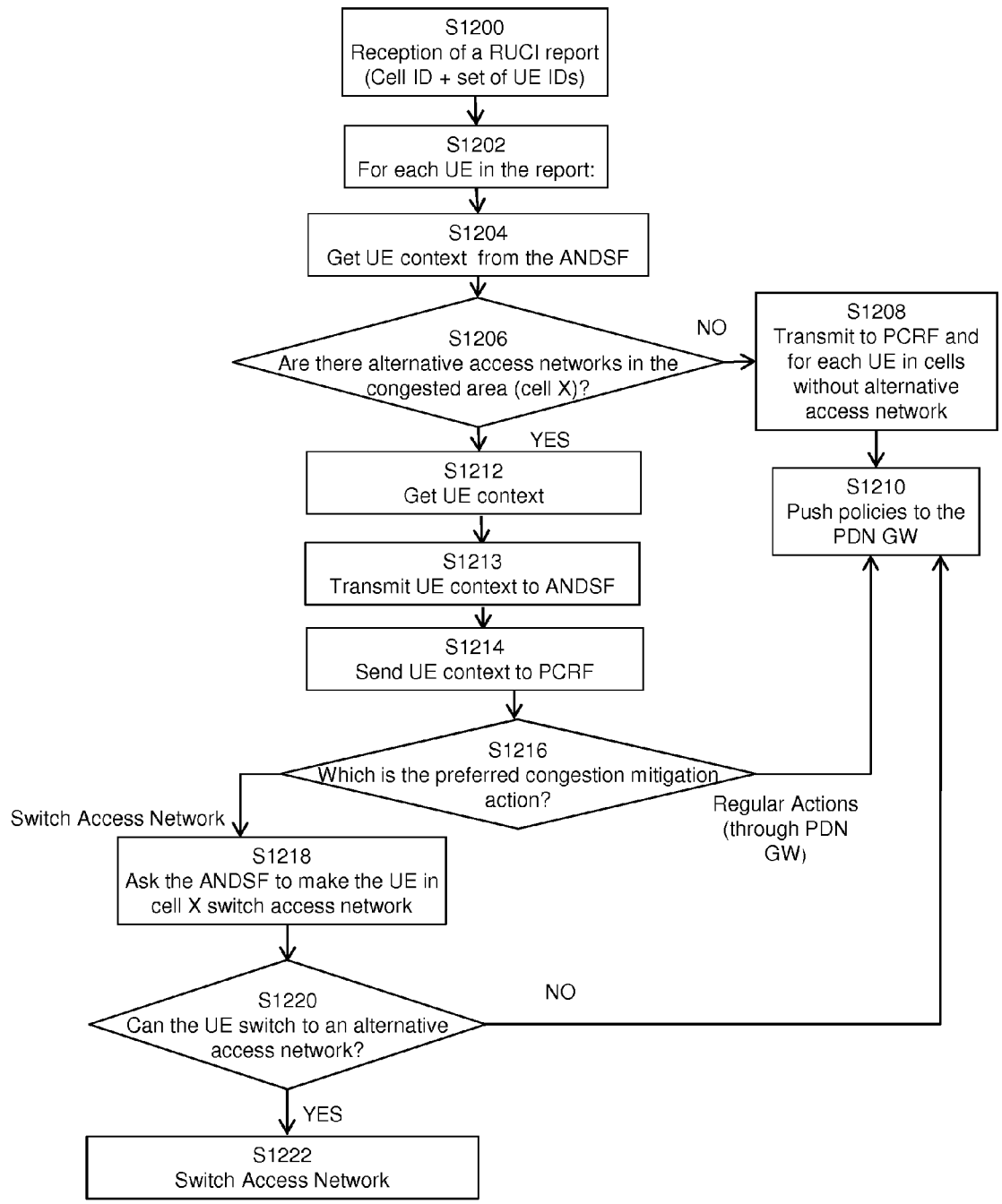
FIG. 12 is a flow diagram showing a method for mitigating congestion.

FIG. 12 is a flow chart of an exemplary method for mitigating congestion.

The receiver 404 of the PCRF 302 receives S1200 the RUCI from the RCAF 300. The alternative network determiner 420 of the PCRF 302 controls the transmitter 402 to transmit S1202, S1204 a request to the ANDSF Server 314 for a context of the UE 312. The alternative access network determiner 516 of the ANDSF Server 314 determines S1206 whether an alternative access network is available for the congested area for the UE.

If not, the alternative network determiner 516 controls the transmitter 502 to transmit S1208 a suitable response to the PCRF 302, the mitigation controller 414 determines congestion mitigation policies and the mitigation instructor 416 controls the transmitter 402 to transmit (push) S1210 the congestion mitigation policies to the PDN GW 310. If an alternative access network is available, the UE context determiner 520 controls the transmitter 502 to transmit S1212 a request to the ANDSF Client 316 at the UE 312 to obtain the UE context information. UE context information may comprise one or more of the UE location and applications recently used or more frequently used by the UE and/or any other UE-related information.

The context determiner 614 of the UE 312 determines the context information for the UE and controls the transmitter 602 to transmit S1213 the determined context information to the ANDSF Server 314. The alternative network determiner 516 determines whether an alternative access network is available for the UE based on its location and data held at the ANDSF Server 314 on areas covered by alternative access networks. The UE context determiner 520 controls the transmitter 502 to transmit S1214 a message to the PCRF 302 comprising a flag indicating whether an alternative access network is available and, optionally, other UE context data such as the application data.

The mitigation controller 414 in an embodiment, or the alternative network determiner 420 in another, determines S1216 which congestion mitigation action is preferred based on the received message from the ANDSF Server 314. If regular congestion mitigation actions are to be taken, the mitigation controller 414 determines congestion mitigation policies, and the mitigation instructor 416 controls the transmitter 402 to transmit (push) S1210 the congestion mitigation policies to the PDN GW 310. If access network switching is determined to be the best congestion mitigation action, the network switcher 422 controls the transmitter 402 to send S1218 a message to the ANDSF Server 314 containing a list of IMSIs identifying the UEs to be switched. The alternative network determiner 516 of the ANDSF Server 314 determines S1220 whether one or more of the UEs can switch to an alternative access network. If not, this is reported to the PCRF 302, the mitigation controller 414 determines congestion mitigation policies, and the mitigation instructor 416 controls the transmitter 402 to transmit (push) S1210 the congestion mitigation policies to the PDN GW 310. If a UE can switch access network, the network switcher 518 of the ANDSF Server 314 controls the transmitter 502 of the ANDSF Server 314 to transmit S1222 instructions to the UE 312 (and the ANDSF client 316) to switch access network.

Figure 13:
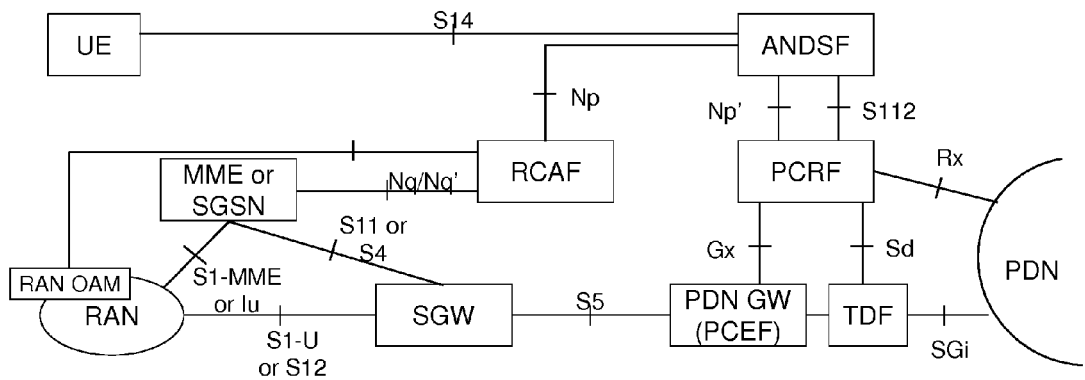
FIG. 13 is a block schematic architecture diagram of a telecommunications system.

Disclosed herein are other methods and apparatus involving fewer round trips for the PCRF 302 to make an accurate decision. In such methods and apparatus, the ANDSF Server 314 plays the role of an Np server (with the RCAF 300 as client) and an Np client (with the PCRF 302 as server), thus becoming a sort of an Np proxy. This is shown in FIG. 13, in which the Np reference point provides electrical communication between the RCAF 300 and the ANDSF Server 314 and the Np' reference point provides electrical communication between the ANDSF Server 314 and the PCRF 302.

Therefore, a Np' reference point (between the ANDSF Server 314 and the PCRF 302) is introduced where RUCI reports are enhanced with a) a per-congested area flag stating whether there are alternative access networks in the cell the report refers to; b) a per-UE flag stating whether there are alternative access networks usable by the UE in the cell the report refers to; c) a per-UE list of available alternative access networks; d) a per-UE list of applications being used by the UE.

The reference point S112 is retained and includes the same functionality as the S112 reference point described above. In this embodiment, the ANDSF Server 314 is the entity that receives the RUCI reports from the RCAF 300 and filters the reports according to the availability of an alternative access network in the congested areas. The reports related to areas without alternative access networks are passed on immediately to the PCRF 302 through the Np' reference point without any modification. The reports related to areas with an alternate access networks are updated according to what has been described in the previous paragraph and sent to the PCRF through the Np' reference point. When the PCRF receives the reports through the Np' reference point, it works in the following way:

For the reports that refer to areas without alternative access network, the PCRF 302 works in its regular way (the mitigation controller 414 determining congestion mitigation policies, and the mitigation instructor 416 controlling the transmitter 402 to transmit the congestion mitigation policies to the PDN GW 310).

For the reports that refer to areas with alternative access network, the PCRF 302 uses the additional information received through the Np' reference point to make a decision. For each UE 312, depending on the result of the evaluation, the PCRF 302 may determine congestion mitigation policies and send them for enforcement to the PDN GW 310, or ask the ANDSF Server 314, through the S112 reference point, to make UEs switch access network.

Figure 14:
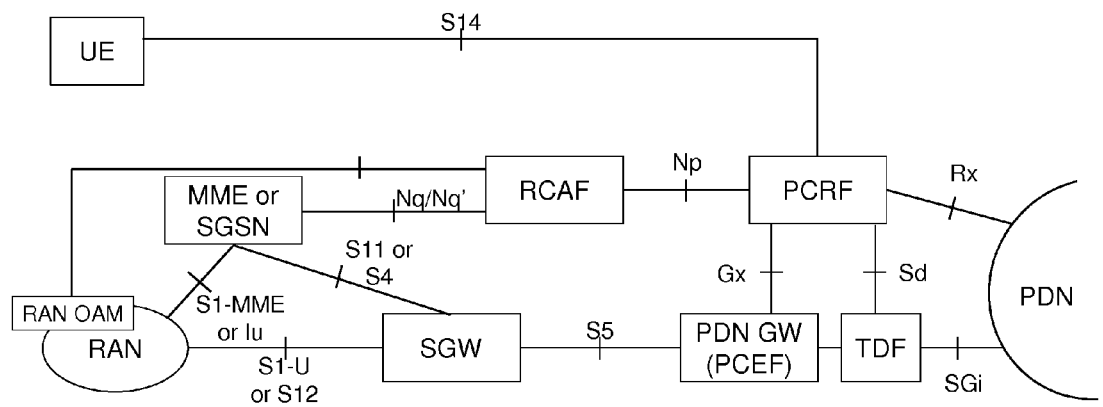
FIG. 14 is a block schematic architecture diagram of a telecommunications system.

In other exemplary methods and apparatus, the PCRF 302 may also fulfil the role of ANDSF Server 314, as shown in FIG. 14, in which the S14 reference point connects directly to the PCRF 302. This embodiment is aligned with the 3GPP UPCON Architecture and removes unnecessary round-trips in other embodiments where ANDSF and PCRF are located in different network nodes.

Figure 15:
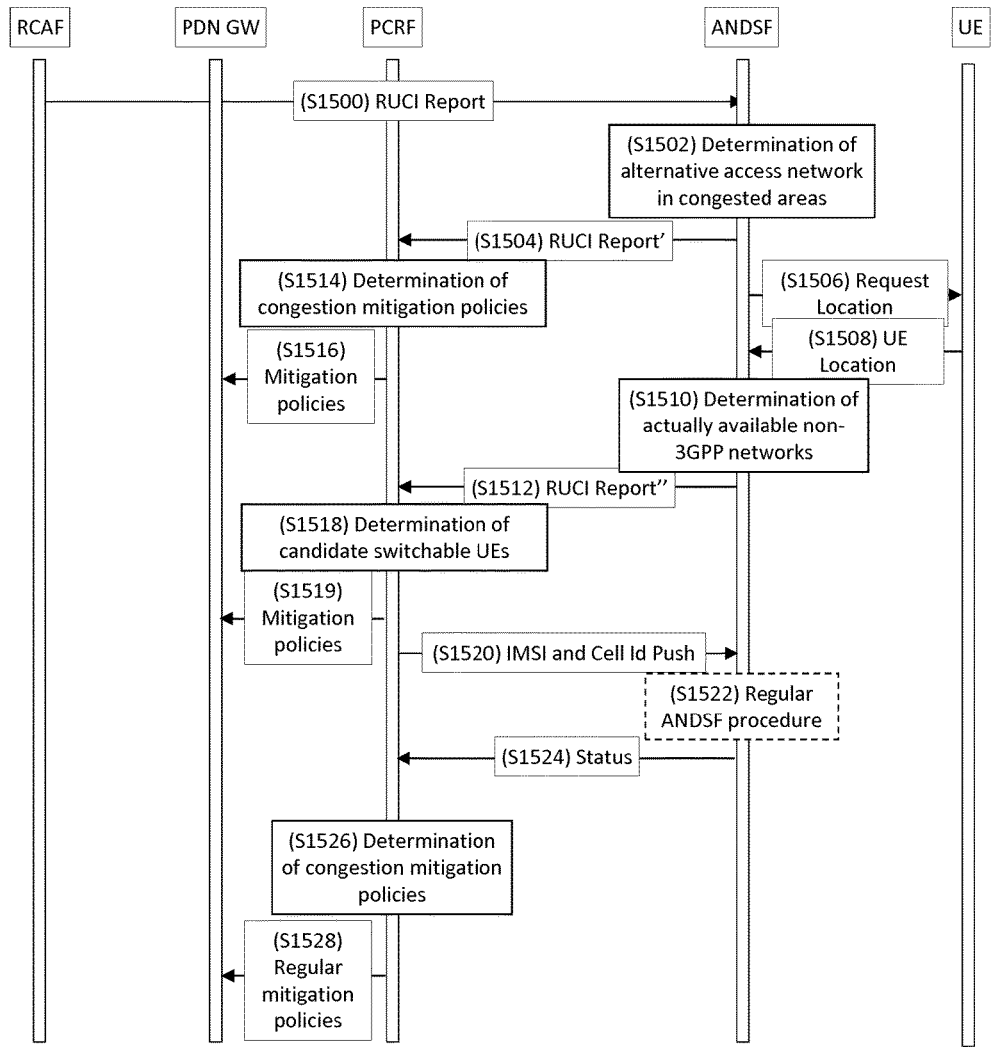
FIG. 15 is a signalling diagram showing a methodology for mitigating congestion.

Referring to FIG. 15, a signalling diagram showing an exemplary methodology for mitigating congestion is shown.

Instead of to the PCRF 302, the RCAF sends S1500 a RUCI report to the ANDSF Server 314. This report contains, for each congested location, location information (for instance, the Cell ID), the severity of the congestion situation, the validity of the congestion situation and the list of affected UEs (each of them identified by means of the IMSI). With regard to the regular behaviour of the current RAN User Plane Congestion architecture, this step involves only the configuration of the RCAF 300 infrastructure to send RUCI reports to the ANDSF Server 314 instead of to the PCRF 302.

Upon reception of the RUCI report, the ANDSF Server 314 inspects first the identifiers of congested areas and determines S1502 in which of them there are alternative access networks.

Next, the ANDSF Server 314 filters the received RUCI report and forwards S1504 the filtered report to the PCRF 302 through the Np' reference point. The filtered RUCI report (RUCI Report') includes only the reports for areas without alternative access networks.

In an asynchronous way, the ANDSF Server 314 queries S1506 the remaining UEs (that is, those UEs located in areas with alternative access networks) in order to get their location and, for UEs with enhanced ANDSF Client 316, the list of applications being used and/or more frequently used and/or any other UE-related information. The ANDSF Server 314 can choose to interrogate only those UEs whose location is not registered in the ANDSF Server 314 or, if registered, not fresh enough. The same applies to the application information or, more general, to the UE context information. The UEs send S1508 their location and application or context information to the ANDSF Server 314.

Depending on their location, the ANDSF Server 314 determines whether the UE 312 is in an area actually served by an alternative access network by comparing the UE location with the static information it stores about the areas served by alternative access networks. The ANDSF Server 314 assembles S1510 a new RUCI report. The new RUCI report (RUCI Report") includes, for each of the UEs not included in the filtered RUCI report in S1504 (that is, those in congested areas with potential alternative access networks) a flag stating whether an alternative access network is available or not and, optionally, application data for each UE. This further filtered RUCI report is sent S1512 to the PCRF 302 through the Np' reference point. The ANDSF Server 314 can include in S1512 a per-UE list of available access networks to enable the PCRF 302 to make further policy decisions.

When the PCRF 302 receives the filtered RUCI report in S1504 from the ANDSF Server 314 it determines S1514 regular congestion mitigation policies for each UE and sends S1516 the congestion mitigation policies to the PDN GW 310.

Upon receipt of the further filtered RUCI report, in S1512 from the ANDSF Server, and according to its internal configuration, to the context information received and to the profile of each subscriber, the PCRF 302 determines S1518, for each congested location, the set of UEs that might switch access network in order to avoid the congestion and those UEs that cannot switch. For a UE that cannot switch access network, the PCRF 302 determines regular congestion mitigation policies and sends S1519 these congestion mitigation policies to the PDN GW 310.

Next, it sends S1520 to the ANDSF Server 314 the information about the congestion location information (i.e. the Cell ID) and the list of IMSI identifying the UEs that must switch access network.

Upon receipt of the request, the ANDSF Server 314 carries out S1522 an ANDSF procedure for every UE 312. Then, the ANDSF Server 314 sends S1524 a report to the PCRF 302. It includes the list of UEs and the result of the ANDSF procedure for each of them. Reports can contain the results for one or a group of UEs.

For those UEs which have not been able to switch access network, the PCRF determines S1526 regular congestion mitigation policies, for each UE, and sends S1528 the congestion mitigation policies to the PDN GW 310.

Figure 16:
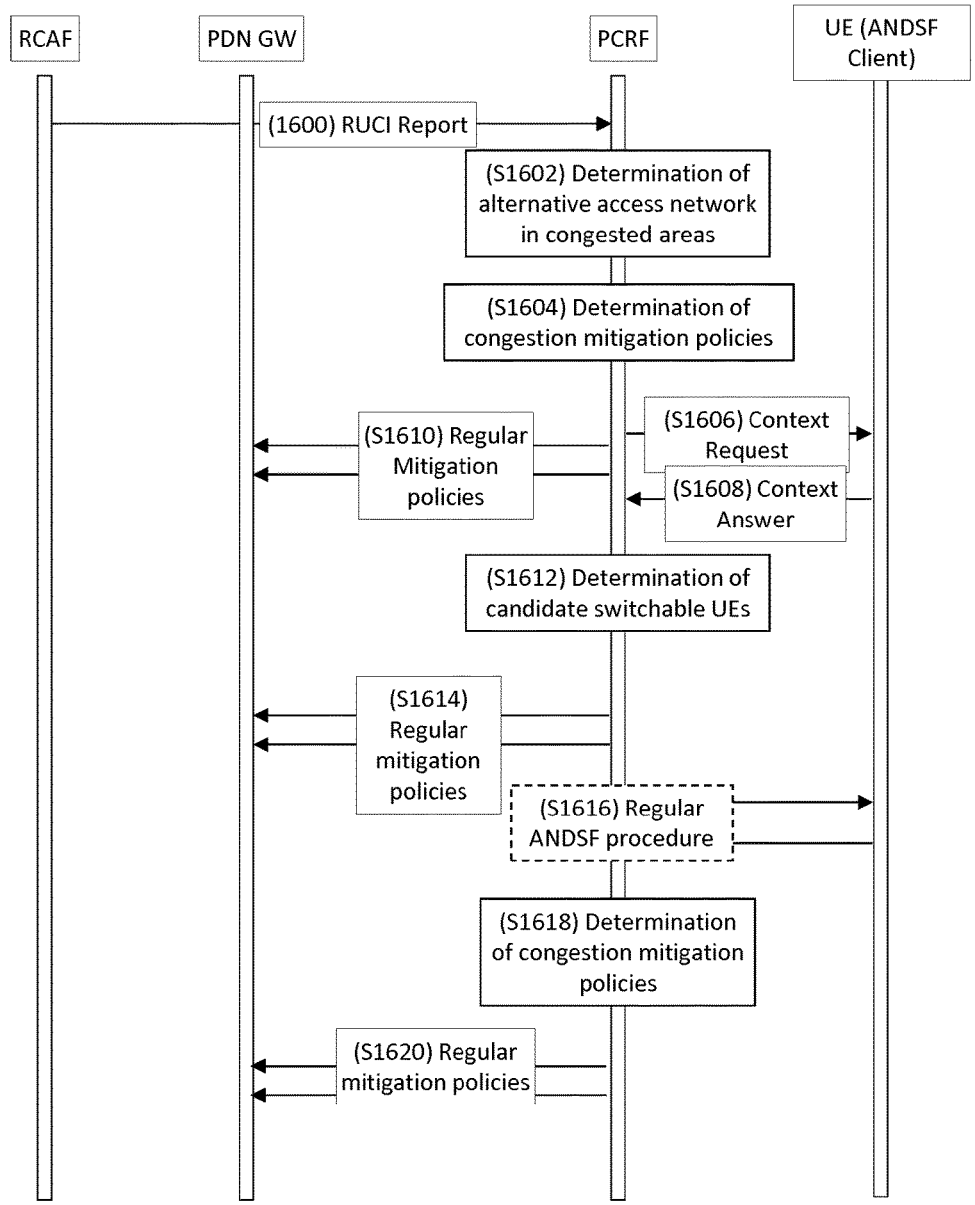
FIG. 16 is a signalling diagram showing a methodology for mitigating congestion.

Referring to FIG. 16, a signalling diagram showing an exemplary methodology for mitigating congestion is shown.

The RCAF 300 sends S1600 a RUCI report to the PCRF 302. The RUCI report contains, for each congested location, location information (for instance, the Cell ID), the severity of the congestion situation, the validity of the congestion situation and the list of affected UEs (each of them identified by means of the IMSI). This is the regular behaviour of the current RAN User Plane Congestion architecture.

Upon reception of the RUCI report, the PCRF 302 inspects first the identifiers of congested areas and determines S1602 in which of them there are alternative access networks.

In an asynchronous way, the PCRF 302 queries S1606, in fulfillment of the ANDSF Server role, the UEs belonging to areas with alternative access networks in order to get their location and, for UEs 312 with enhanced ANDSF Client 316, the list of applications being used and/or more frequently used and/or any other UE-related information. The PCRF 302, fulfilling the role of ANDSF Server, can choose to interrogate only those UEs whose location is not registered in the PCRF 302 or, if registered, not fresh enough. The same applies to the application information or, more general, to the UE context information. The UEs 312 send S1608 their location and application or context information to the PCRF 302, fulfilling the role of ANDSF Server.

In the meantime, the PCRF 302 determines S1604 regular congestion mitigation policies for the UEs 312 located in congested areas without alternative access networks and sends S1610 the congestion mitigation policies to the PDN GW 310.

For the UEs 312 with available alternative access networks, according to its internal configuration, to the context information received and to the profile of each subscriber, the PCRF 302 determines S1612, for each congested location, the set of UEs that might switch access network in order to avoid the congestion and those UEs that cannot switch. For a UE that cannot switch access network, the PCRF 302 determines regular congestion mitigation policies and sends S1614 these congestion mitigation policies to the PDN GW 310.

The PCRF 302, fulfilling the role of ANDSF Server, carries out S1616 the ANDSF procedure for every UE.

For those UEs which have not been able to switch access network, the PCRF determines regular congestion mitigation policies, for each UE S1618, and sends S1620 the congestion mitigation policies to the PDN GW 310.

Methods and apparatus disclosed herein relate to the interworking of the PCRF 302 and the ANDSF Server 314 to provide the means to extend the set of available congestion mitigation actions and to make the decision process in congestion situations more fine-grained. Keeping the central role of the PCRF 302 as policy decision point with regard to congestion mitigation, it is able to contact the ANDSF 314 to make a UE 312 switch access network and also to get information from the UEs 312 in order to count with more information when making a decision. Examples of said information are the presence of the UE 312 in an area actually served by an alternative access network, or the application(s) being used by the user at the UE 312, so that congestion mitigation actions, i.e. policies, could be chosen in order minimize its impact in the users' experience.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A network node in a telecommunications network, wherein the network node is for use as a Policy and Charging Rules Function (PCRF) and comprising:
   a receiver configured to receive congestion data identifying a congested area (A-H) and one or more user equipment (UE), affected by the congested area, wherein the congestion data comprises Radio Access Network User Plane Congestion Information (RUCI) received from a further node for use a Radio Access Network Congestion Awareness Function (RCAF);
   an alternative network determiner configured to determine one or more candidate switchable UEs, amongst the identified UEs, that may be offloaded to an alternative access network;
   a network switcher configured to control a transmitter to transmit, towards a further node for use as an Access Network Discovery and Selection Function (ANDSF), an instruction for one or more of the candidate switchable UEs to switch to the alternative access network; and
   wherein the receiver is configured to receive, from the further node for use as the ANDSF, information relating to the affected UEs have been switched to the alternative access network and those that have not.

2. The network node according to claim 1, wherein the alternative network determiner is configured to determine the candidate switchable UEs based on a location of a UE, a location of an alternative access network and/or the capability of a UE to use an alternative access network.

3. The network node according to claim 2, further comprising a locator configured to control the transmitter to transmit a request to a UE for data relating to the location of the UE, wherein the receiver is configured to receive a response from the UE comprising data relating to the location of the UE.

4. The network node according to claim 2, further comprising a UE context determiner configured to control the transmitter to transmit a request to a UE for data relating to a context of the UE, wherein the receiver is configured to receive a response from the UE comprising data relating to the context of the UE.

5. The network node according to claim 4, wherein the data relating to the context of the UE comprises one or more of: a current application running on the UE; a most recent application running on the UE; and a most frequently run application on the UE.

6. The network node according to claim 1, wherein the alternative network determiner is configured to determine whether the congested area comprises an alternative access network.

7. The network node according to claim 1, further comprising a mitigation controller configured to determine congestion mitigation policies for the affected UEs that have not been switched to the alternative access networks, and a mitigation instructor configured to control the transmitter to transmit the congestion mitigation policies to a Policy and Charging Enforcement Function, PCEF, in order to trigger corresponding congestion mitigation actions by the PCEF.

8. A network node in a telecommunication network, wherein the network node is for use as an Access Network Discovery and Selection Function (ANDSF) and comprises;
   a receiver configured to receive congestion data identifying; a congested area and one or more user equipment (UE) affected by the congested area, wherein the congestion data comprises Radio Access Network User Plane Congestion Information (RUCT) received from a farther node for use as a Policy and Charging Roles Function (PCRF);
   an alternative network determiner configured to determine one or more candidate switchable UEs, amongst the identified UEs, that may be offloaded to an alternative access network;
   a network switcher configured to control a transmitter to transmit an instruction for one or more of the candidate switchable UEs to switch to the alternative access network; and
   wherein the transmitter is configured to transmit data, toward the further network node for use as a PCRF wherein the data comprises information relating to the affected UEs that have been switched to the alternative access network and those that have not.

9. The network node according to claim 8, wherein the data transmitted to the further node comprises data relating to the context of one or more UEs.

10. The network node according to claim 8, wherein the alternative network determiner is configured to determine whether an alternative access network is available in the congested area and to control the transmitter to transmit to a further node for use as a PCRF, data identifying whether an alternative access network is available in the congested area.

11. The network node according to claim 8, wherein the alternative network determiner is configured to control the transmitter to transmit to a further node for use as a PCRF, data identifying the one or more candidate switchable UEs,
    and wherein the receiver is configured to receive from the further network node for use as a PCRF, data identifying which of the one or more candidate switchable UEs should be switched to an alternative access network.

12. The network node according to claim 8, wherein, in advance of receiving the congestion data, the receiver is configured to receive a request from a further node for use as a PCRF the request being for data relating to whether an alternative access network is available in one or more congested areas,
    and wherein the locator is configured to determine whether an alternative access network is available and to control the transmitter to transmit a response to the further network node accordingly.

13. A method for operating a network node in a telecommunications network, wherein the network node is for use as a Policy and Charging Rules Function (PCRF), the method comprising:
    receiving, at a receiver, congestion data identifying a congested area and one or more user equipment (UE), affected by the congested area, wherein the congestion data comprises Radio Access Network User Plane Congestion Information (RUCI) received from a further node for use a Radio Access Network Congestion Awareness Function (RCAF);
    determining, at an alternative network determiner, one or more candidate switchable UEs, amongst the identified UEs, that may be offloaded to an alternative access network;
    controlling, by a network switcher, a transmitter to transmit, towards a further node for use as an Access Network Discovery and Selection Function (ANDSF), an instruction for one or more of the candidate switchable UEs to switch to the alternative access network;
    receiving, at the receiver, from the further node for use as the ANDSF, information relating to the affected UEs have been switched to the alternative access network and those that have not.

14. The method according to claim 13, further comprising determining, by the alternative network determiner, the candidate switchable UEs based on a location of a UE, a location of an alternative access network and/or the capability of a UE to use an alternative access network.

15. The method according to claim 14, further comprising controlling, by a locator, the transmitter to transmit a request to a UE for data relating to the location of the UE, and receiving, by the receiver, a response from the UE comprising data relating to the location of the UE.

16. The method according to claim 14, further comprising controlling, by a UE context determiner, the transmitter to transmit a request to a UE for data relating to a context of the UE, and receiving, by the receiver, a response from the UE comprising data relating to the context of the UE.

17. The method according to claim 16, wherein the data relating to the context of the UE comprises one or more of: a current application running on the UE; a most recent application running on the UE; and a most frequently run application on the UE.

18. The method according to claim 13, further comprising determining, by the alternative network determiner, whether the congested area comprises an alternative access network.

19. The method according to claim 13, further comprising determining, by a mitigation controller, congestion mitigation policies for the affected UEs that have not been switched to the alternative access networks, and further comprising controlling, by a mitigation instructor, transmission by the transmitter of the congestion mitigation policies to a Policy and Charging Enforcement Function, PCEF in order to trigger corresponding congestion mitigation actions by the PCEF.

20. A method for operating a network node in a telecommunications network, wherein the network node is for use as an Access Network Discovery and Selection Function (ANDSF), the method comprising:
    receiving, at a receiver, congestion data identifying a congested area and one or more user equipment (UE), affected by the congested area, wherein the congestion data comprises Radio Access Network User Plane Congestion Information (RUCI) received from a further node for use a Policy and Charging Rules Function (PCRF);
    determining, at an alternative network determiner, one or more candidate switchable UEs, amongst the identified UEs, that may be offloaded to an alternative access network;
    controlling, by a network switcher, a transmitter to transmit, towards a further node for use as an Access Network Discovery and Selection Function (ANDSF), an instruction for one or more of the candidate switchable UEs to switch to the alternative access network;
    transmitting, by the transmitter, data to the further network node for use as a PCRF, wherein the data comprises information relating to the affected UEs that have been switched to the alternative access network and those that have not.

21. The method according to claim 20, wherein the data transmitted to the further node comprises data relating to the context of one or more UEs.

22. The method according to claim 20, further comprising determining, by the alternative network determiner, whether an alternative access network is available in the congested area and controlling, by the alternative network determiner, the transmitter to transmit to a further node for use as a PCRF, data identifying whether an alternative access network is available in the congested area.

23. The method according to claim 20, further comprising controlling, by the alternative network determiner, the transmitter to transmit to a further node for use as a PCRF, data identifying the one or more candidate switchable UEs,
    and further comprising receiving, by the receiver from the further network node for use as a PCRF, data identifying which of the one or more candidate switchable UEs should be switched to an alternative access network.

24. The method according to claim 20, wherein, in advance of receiving the congestion data, the receiver receives a request from a further node for use as a PCRF the request being for data relating to whether an alternative access network is available in one or more congested areas, and wherein the locator determines whether an alternative access network is available and controls the transmitter to transmit a response to the further network node accordingly.

25. A computer program comprising instructions which, when executed on at least one processor, cause the at least one processor to carry out the method according to claim 13.

26. A carrier containing the computer program of claim 25, wherein the carrier is one of an electronic signal, optical signal, radio signal, or non-transitory computer readable storage medium.

27. A computer program comprising instructions which, when executed on at least one processor, cause the at least one processor to carry out the method according to claim 20.

* * * * *